United States Patent
Puleo et al.

(10) Patent No.: US 12,453,967 B2
(45) Date of Patent: Oct. 28, 2025

(54) CLOSED SYSTEM CENTRIFUGE TUBE FOR PERFORMING SAMPLE TRANSFER

(71) Applicant: General Electric Company, Schenectady, NY (US)

(72) Inventors: Christopher Michael Puleo, Niskayuna, NY (US); Ralf Lenigk, Schnectady, NY (US); Tejas Suresh Khire, Niskayuna, NY (US); Tyler Hammond, Amsterdam, NY (US); Erik Leeming Kvam, Niskayuna, NY (US); Allison Caron, Burnt Hills, NY (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 963 days.

(21) Appl. No.: 17/573,311

(22) Filed: Jan. 11, 2022

(65) Prior Publication Data
US 2023/0219080 A1    Jul. 13, 2023

(51) Int. Cl.
B01L 3/00    (2006.01)

(52) U.S. Cl.
CPC ....... B01L 3/5021 (2013.01); B01L 3/502715 (2013.01); *B01L 2200/10* (2013.01); *B01L 2300/087* (2013.01)

(58) Field of Classification Search
CPC ............ B01L 3/5021; B01L 3/502715; B01L 2200/10; B01L 2300/087; B01L 2300/046; B01L 2300/0832; B01L 2300/0854
USPC ................................................. 422/549, 500
See application file for complete search history.

(56) References Cited

U.S. PATENT DOCUMENTS

| | | | | |
|---|---|---|---|---|
| 4,425,235 A * | 1/1984 | Cornell | ................ | G01N 33/491 422/918 |
| 5,286,454 A * | 2/1994 | Nilsson | ................ | G01N 21/07 436/178 |
| 8,567,609 B2 * | 10/2013 | Landrigan | ............ | G01N 1/4077 422/550 |
| 10,421,070 B2 | 9/2019 | Chiu et al. | | |
| 10,821,436 B2 | 11/2020 | Handique et al. | | |
| 2006/0228793 A1 * | 10/2006 | Cho | .................. | B01L 3/502715 435/288.5 |

(Continued)

FOREIGN PATENT DOCUMENTS

| KR | 102099151 B1 | 4/2020 |
|---|---|---|
| KR | 102185443 B1 | 12/2020 |
| WO | 2016133783 A1 | 8/2016 |

(Continued)

OTHER PUBLICATIONS

Pembrey, Richard S., et al.; "Cell Surface Analysis Techniques: What Do Cell Preparation Protocols Do to Cell Surface Properties?", Applied and Environmental Microbiology, 1999, vol. 25, No. 7, p. 2877-2894.

(Continued)

*Primary Examiner* — Christine T Mui
(74) *Attorney, Agent, or Firm* — Fletcher Yoder, P.C.

(57) ABSTRACT

A closed system centrifuge tube is described and discussed herein that enables removal of waste and transfer and removal of samples via one or more ports of the centrifuge tube within the closed system, without exposing the sample to the outer environment. This may enable greater sample retention during sample processing and centrifugation of the sample.

15 Claims, 28 Drawing Sheets

(56) References Cited

U.S. PATENT DOCUMENTS

2021/0220831 A1    7/2021  Wu et al.

FOREIGN PATENT DOCUMENTS

WO         2020034482  A1     2/2020
WO     WO2020/141332  A1  *  7/2020  ............. B01D 17/02

OTHER PUBLICATIONS

Peterson, Brandon W., et al.; "Bacterial Cell Surface Damage Due to Centrifugal Compaction", Applied and Environmental Microbiology, 2012; p. 120-125.

* cited by examiner

CLOSED SYSTEM CENTRIFUGE TUBE FOR PERFORMING SAMPLE TRANSFER

STATEMENT REGARDING FEDERALLY SPONSORED RESEARCH & DEVELOPMENT

This invention was made with U.S. Government support under Agreement No. W15QKN-16-9-1002 awarded by the ACC-NJ to the MCDC. The Government has certain rights in the invention.

BACKGROUND

The subject matter disclosed herein relates to a closed system centrifuge tube. Specifically, centrifuge systems that include a closed system that are suitable for testing nucleic acid amplification technologies including polymerase chain reaction (PCR) and sample preparation as well as other tasks where closed system centrifugation would be beneficial.

The use of centrifuge tubes to separate a sample from an overall solution including the sample and reagents is a common lab procedure used to isolate samples to perform low volume testing on the sample (e.g., low volume digital PCR). However, sample loss during the isolation and/or the waste removal process may lead to decreased sample concentration for testing without an efficient and closed-system method of transferring the pelleted sample material to the analytical cartridge.

The transfer of samples from centrifuge tubes and/or other preparation tubes to a low volume digital PCR chip for loading into a digital PCR device may be completed to perform PCR on collected cell samples. The preparation process for the samples may include multiple preparation components (e.g., reagents) that are necessary to add to the sample before PCR processing can be conducted. If performed manually (i.e., opening the tube and removing supernatant, adding wash liquid, and/or harvesting the pellet), these steps involve injecting and removing buffer solutions and other components into the tube containing the sample. This removal may lead to large sample loss and dilution prior to extraction of the pellet or centrifuged sample, and transfer to an analytical system or device (e.g., digital PCR device). The sample loss may be due to sample exposure to pipette tips and other sample manipulation devices during injection and removal of reagent solutions and/or during opening of the tube during the PCR preparation process. Furthermore, in traditional centrifuge tubes the user must gauge the distance between the pellet and pipette tip or other liquid transfer device, while removing supernatant and waste, a process which is subject to user error and sample loss. Alternately, insufficient removal of undesired supernatant ("waste") from the top of pellet layer can result in contamination of pelleted sample and also dilute the pellet volume. All these may result in poor results from downstream (e.g., post centrifugation) analytical tests (such as, digital PCR), due to loss/contamination of the sample prior to analysis and not any inherent limitations of the analytical process (e.g., digital PCR). These losses are especially problematic when dealing with low-volume assays (e.g., assays such that the input volume of the analytical device is low, such as 1-50 microliters), as the volume of liquid used to extract the pellet post-centrifugation must correspond to the downstream assay volume. The process of removing small volumes of liquid from the centrifuge may present difficulties using current removal methods.

BRIEF DESCRIPTION

The disclosed embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a closed system centrifuge tube is provided that includes an inner centrifuge tube that includes a main loading port, an acute-angled elbow joint distal to the main loading port, and a pellet accumulation zone at a terminus of the acute-angled elbow joint. The closed system centrifuge tube further includes, one or more pellet removal ports disposed on the same surface as the main loading port and located distal to the acute angled elbow joint, and a microchannel that runs through thin walls of the inner centrifuge tube. In some embodiments, the microchannel is connected to the pellet accumulation zone through the acute-angled elbow joint and connected to one or more pellet removal ports.

In another embodiment, a method is provided that includes connecting a transfer syringe to a main loading port disposed on a centrifuge tube, inserting a sample into the centrifuge tube through actuation of a plunger of the transfer syringe connected to the main loading port, and inserting the centrifuge tube into a centrifuge for centrifugation. Further, the method includes centrifuging the sample within the centrifuge tube, removing supernatant from the centrifuge tube via attaching a transfer device to a waste removal port of the centrifuge tube, extracting supernatant through a separate microchannel (not the same as the one used for pellet handling), via the transfer device, until a threshold transfer volume of supernatant remains with a pellet, and connecting the transfer device filled with washing reagents to an additional port disposed on the centrifuge tube. Additionally, the method includes inserting the washing reagents, via the transfer device, to wash the pellet; and removing the pellet, via a pellet removal port of the centrifuge tube, through actuation of the plunger of the transfer syringe connected to the pellet removal port.

In yet another embodiment, a centrifuge tube is provided that includes three or more ports disposed at an end of the centrifuge tube, wherein a sample and reagent insertion port of the three or more ports is in communication with an inner volume of the centrifuge tube. The centrifuge tube further includes, an asymmetrically tapered funnel disposed opposite the three or more ports at a distal end of the centrifuge tube, and a pellet accumulation zone disposed at one portion of the asymmetrically tapered funnel, wherein the pellet accumulation zone comprises a microchannel opening coupled to an acute-angled elbow joint that enables pellet accumulation during centrifugation, and wherein the microchannel is located within an outer volume of the centrifuge tube and coupled to a pellet removal port of the three or more ports. Additionally, the centrifuge tube includes a waste removal port of the three or more ports that enables waste liquids to be removed from a waste accumulation zone adjacent to and separate from the pellet accumulation zone, wherein the waste accumulation zone is disposed at a certain height above the pellet accumulation zone.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
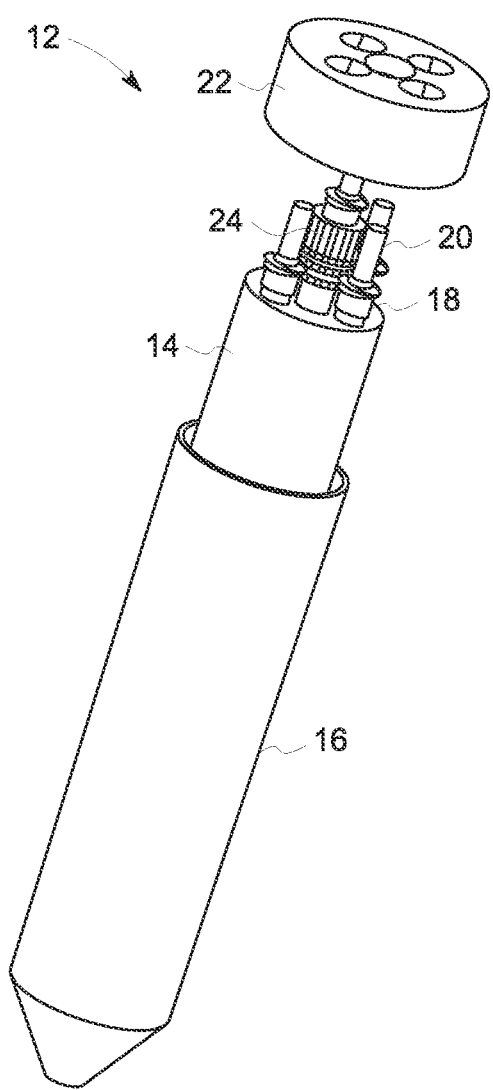
FIG. 1 depicts an exploded view of a closed system centrifuge tube, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Any examples or illustrations given herein are not to be regarded in any way as restrictions on, limits to, or express definitions of, any term or terms with which they are utilized. Instead, these examples or illustrations are to be regarded as being described with respect to various particular embodiments and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. Language designating such non-limiting examples and illustrations includes, but is not limited to: "for example," "for instance," "such as," "e.g.," "including," "in certain embodiments," "in some embodiments," and "in one (an) embodiment."

As discussed herein, one issue that can arise with use of a centrifuge tube is sample loss due to the need to open the centrifuge tube system and manually manipulate the sample and pellet to dispose of waste and excess solution and insert reagents during the sample preparation process. As used herein, the centrifuge tube may be any suitable tube for containing a laboratory sample for testing. For practical purposes, the centrifuge tube may be thought of as a standard laboratory tube device, with one or more openings at the top to allow for sample insertion and other reagent/solution insertion for sample preparation. The opening are sealed with a resealable or self-healing polymer interface to maintain a closed system, but still allow access to the ports for sample introduction, reagent introduction, waste, or sample removal. With respect to the open system nature of traditional centrifuge tubes, samples may become contaminated during insertion of additional reagents into the sample. Additionally, the open nature of the tube may expose the user to the sample or vice versa. Sample loss may also occur during waste removal of excess solution from the tube after centrifugation. Specifically, the sample loss may occur during waste removal performed by the user separating out the supernatant from pelleted materials through manual intervention. By way of example, during sample preparation the sample may be transferred multiple times into different buffers and/or washes for preparation. In addition, final sample extraction and transfer of the pelleted sample into multiple tubes and/or wells for analysis is challenging, and sample loss may occur during the multiple transfer steps due to some loss of sample during transfer in the tubes and/or wells and also via the transfer device (e.g., pipette syringe).

Further, other challenges with isolating samples during sample preparation and centrifugation may involve lack of isolation of the sample after centrifugation. With respect to these factors, manipulation of the sample and/or pellet formed during centrifugation, due to design of the tube, may involve some sample loss during pellet removal due to lack of pellet isolation in a tube component during the centrifuge process. Lack of pellet localization may lead to decreased sample concentration as described. Such factors can result in poor test results and analysis, especially in terms of low volume test devices such as low-volume digital PCR.

Due to the issues noted above, as well as to ensure maximum sample throughput after sample preparation and/sample centrifugation, it is desirable to create a closed tube system that enables removal and addition of solutions to the tube without exposing the sample during the solution removal and addition. Such a closed system tube design may include a multitude of factors (e.g., multiple ports for waste removal, separation of sample from excess solution, ports for pellet isolation and removal during centrifuging, storage of waste in the tube, and so forth), that enable control of the location of the pellet, and manipulation of said pellet through ports that are in designed communication with the pellet location. Which factor(s) are considered may depend on considerations such as the intended use of the tube and the type of sample being prepared. Further, in some implementations one or more tube designs may be selected depending on preparation and testing required for the sample.

While various factors may be considered as part of tube design as discussed herein, in certain embodiments designs will be implemented according to desired sample collection. By way of example, a tube design could involve different possible closed system forms of waste removal. It should be considered that all embodiments may be useful for implementing a closed system tube for sample preparation and processing. As used herein, the collection efficiency of the sample collection system for uses such as bacteria analysis may be colony forming units/milliliters (CFU/mL). This may be used to quantify sample concentration after centrifugation.

With this in mind, the techniques and approaches discussed herein comprise combinations of physical embodiments of a closed system tube for sample collection that maintains liquid access to the pellet for manipulation and high efficiency pellet extraction. Indeed, while the presently described techniques and approaches may be useful for mitigating sample loss during centrifugation processes these approaches may also be employed to mitigate sample contamination during sample preparation procedures.

To that end, the closed centrifuge tube may include many components to mitigate sample contamination and sample loss throughout a sample preparation process (e.g., addition of buffers, additional of reagents, centrifuging). By way of example, FIG. 1 depicts an exploded view of a centrifuge tube system 12, in accordance with the present embodiments. The depicted system includes an outer tube casing 16 that encases an inner centrifuge tube 14 that enables insertion of samples into the inner centrifuge tube 14 for centrifuging. The outer tube casing 16 may provide a robust container for the inner centrifuge tube 14 and may be compatible with all standard commercial centrifuge machines, i.e., it may be sized in accordance with a conventional centrifuge tube. The outer casing may also function as a shell in case of an internal liquid spill to separate the user from the inner centrifuge 14 liquid spill. In some embodiments, the outer tube casing 16 may not be present and the closed system centrifuge tube 14 may include the inner centrifuge 14 without the outer tube casing 16.

The centrifuge tube system 12 may be around 100-150 mm in length and around 20-40 mm in width, but also may be any other suitable length and width corresponding to the total centrifuge tube system 12 tube holder volume. For example, the centrifuge tube system may be 110 mm in length, 30 mm in width, and may be 50 mL in volume. The inner centrifuge tube 14 height may correspond to the length of the total centrifuge tube system 12. For example, the inner centrifuge length may be about 10 mm less that the total length of the centrifuge system 12. The inner centrifuge tube 14 length may also be shorter than 10 mm less than the total length of the centrifuge system 12 depending on the necessary volume needed for the sample preparation protocols. Additionally, the inner centrifuge tube 14 width may be 18-25 mm in length. These dimensions enable the inner centrifuge tube 14 to fit within the outer tube casing 16 of the centrifuge tube system 12. The volume of the inner centrifuge tube 14 may be based on the height and width of the tube, and may be in the range of 5-20 mL or any other suitable volume corresponding to sample preparation protocols. The inner centrifuge tube 14 may be any volume that is less than the outer tube casing 16 in embodiments where an outer tube casing 16 is present. The outer tube casing 16 may be any suitable volume that fits into a standard centrifuge rotor.

The inner centrifuge tube 14 includes multiple ports 18 (e.g., actuation ports, suction ports) for solution and/or sample insertion and removal. The actuation and suction ports may enable introduction of the sample and various fluid transfer steps by application of negative pressure (e.g., suction) or positive pressure to the ports. The inner centrifuge tube 14 may also include a hanging insert 24 (e.g., screwing lid attachment). The inner centrifuge tube may also include an intermediate storage container for removed wastes (e.g., suctioned waste) inside the centrifuge tube, to eliminate the need for removing waste liquid to an external environment. The multiple ports 18 are disposed on the top of the inner centrifuge tube 14 and include one or more external caps 20 that may seal off the ports when desired to enable a closed system. The closed system centrifuge tube 12 may include an outer tube cap 22 that may be attached to the top of the closed system centrifuge tube 12. In some embodiment, the inner centrifuge tube 14 may not include the outer tube cap 22. The outer tube cap 22 may include multiple cut out sections that are cut out based on the size of the multiple ports 18. The outer tube cap 22 is designed to leave a portion of the multiple ports 18 and the external caps 20 fitted to the ports to be exposed after the tube cap 22 attachment. As discussed above, in some embodiments the inner centrifuge tube 14 may be sealed at the multiple port 18 surfaces, and may not include the outer tube cap 22. The material for centrifuge tube system 12 construction may be acrylonitrile butadiene styrene (ABS) or any other suitable ABS-like material. The centrifuge tube system 12 may be manufactured using 3D printing technologies (e.g., with a resolution of about 100 microns), or any other suitable manufacturing method. For large scale manufacturing injection molding or other large scale manufacturing techniques may be implemented. The centrifuge tube system 12 may be manufactured using injection molding, and any suitable material may be used for the injection molding process of the centrifuge tube system 12.

Figure 2:
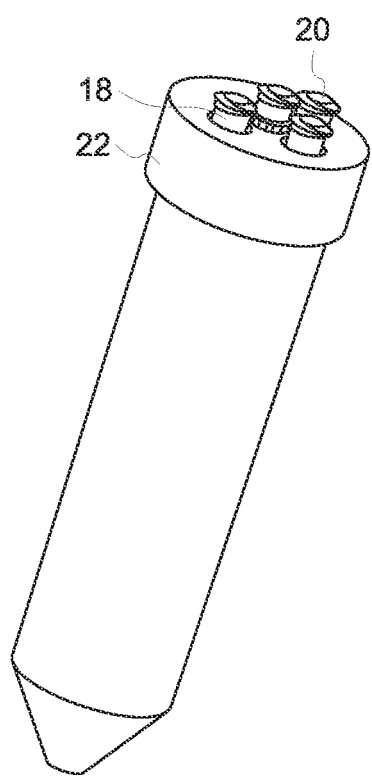
FIG. 2 depicts an assembled view of the closed system centrifuge tube of FIG. 1, in accordance with embodiments of the present disclosure.

Further, FIG. 2 depicts an assembled view of the centrifuge tube system 12, in accordance with embodiments of the present disclosure. As described above the outer tube cap 22 may include one or more cut out sections that enable the outer tube cap 22 to leave a portion of the multiple ports 18 exposed. This may enable access to the multiple ports 18 when the centrifuge tube system 12 is in a closed system embodiment, with the outer tube cap attached to the centrifuge tube system 12. Additionally, the outer tube cap 22 may include a polymer coating to enable closed port access to multiple ports 18 exposed on the top of the tube. The inner centrifuge tube 14 may be any suitable size centrifuge tube (e.g., 5-20 mL). The inner centrifuge tube 14 may function in a fixed-angle rotor centrifuge machine, but it should be understood the centrifuge tube system 12 may function in different types of centrifuge machines and is not limited to fixed-rotor contexts.

Figure 3:
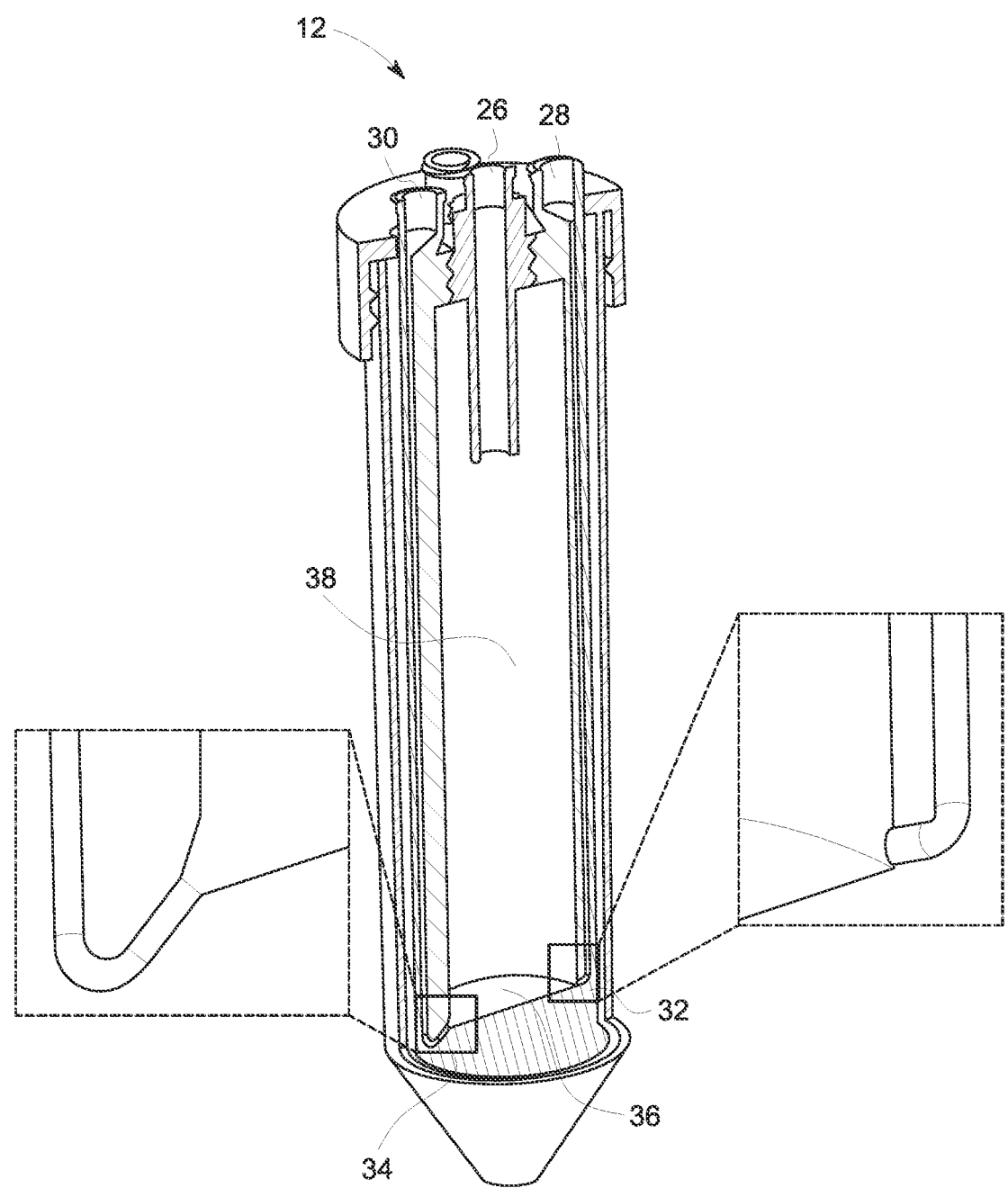
FIG. 3 depicts an internal view of the closed system centrifuge tube of FIG. 1, in accordance with embodiments of the present disclosure.

Based on the above, FIG. 3 depicts an internal view of the centrifuge tube system 12, in accordance with embodiments of the present disclosure. The centrifuge tube system 12 may be designed to include multiple ports 18. The multiple ports may include one or more sample inlet ports 26. The sample inlets ports 26 may function to receive a sample via an insertion device (e.g., syringe, pipette). The sample inlet port 26 may enable a biological sample to be deposited into the tube without opening the centrifuge tube system 12 and exposing the biological sample to the user. The sample inlet port 26 may enable attachment of any standard insertion device (e.g., syringe) used in biological applications. It should be understood that the sample inlet port 26 may receive any sample type at the port.

The centrifuge tube system 12 may also include one or more waste removal ports 28, that enables removal of solution waste from the sample throughout the sample preparation and/or centrifugation process. The waste removal ports 28 may enable closed system access for removal of a supernatant (e.g., solution separated from product during centrifugation) without exposing the solutions and/or products in the centrifuge tube system 12 to the environment, and may also function to remove the waste product after centrifugation without disturbing and or removing any of the desired product of the centrifugation (e.g., pellet). The physical dimensions between the opening of the waste removal port, and the opening of the pellet extraction port are designed such that a defined volume of liquid sits between the pellet and the waste removal port opening. The waste removal port 28 is connected to the inner centrifuge tube 14 via thin walled channels (e.g. 0.5-0.7 mm). The opening is also positioned above the pellet extraction port and on the opposite side of the tube, enabling direct control of the liquid volume encasing the pellet, and manipulation and removal of supernatant without disturbing the pellet.

The waste removal ports 28 may built of configured in accordance with a standard that is compatible with any suitable syringe or removal device used in standard biological applications. The centrifuge tube system 12 may further include one or more pellet removal ports 30 utilized for removal of the pellet (e.g., isolated product of the centrifugation process). The pellet removal ports 30 may enable removal of and washing (e.g., application of solution as washing agent to resuspend cells) of the pellet without the need for the pellet to be exposed to the environment outside of the centrifuge tube system 12. The pellet removal ports 30 may also be compatible with any suitable syringe or removal device used in standard biological applications. The multiple ports 18 discussed above may be at the top of the inner centrifuge tube 14 and continue internally into the inner centrifuge tube 14 for deposit and/or withdrawal of the desired materials. The one or more sample inlet ports 26 may be disposed in the center of the circular top component of the inner centrifuge tube 14. The one or more waste removal ports 28 and the one or more pellet removal ports 30 openings may be disposed distally to the one or more sample inlet ports 26. It should be understood that although one embodiment of the multiple port 18 placement is discussed above, any suitable arrangement of the multiple ports 18 may be used for the centrifuge tube system 12.

The multiple ports 18 described above may be connected to zones (e.g., areas within the tube) inside the inner centrifuge tube 14 that include areas that correspond to the waste and/or pellet product accumulation after the centrifugation process. The multiple ports 18 may be connected through thin-walled columns within the tube to the zones. For example, the waste removal port 28 may be connected via walled columns in the interior of the centrifuge tube system 12 to the waste removal zone 32. The waste removal zone 32 may be separate from, but adjacent to a pellet accumulation zone 34 to shelter the pellet product from the suction at the waste removal zone 32, such as may be introduced by a syringe at the waste removal port 28. For example, the waste removal zone 32 may be used for blood samples which form viscous pellets during centrifuging. The viscous pellets formed by centrifuging the blood samples allows for the pellet to be collected in the pellet accumulation zone 34 and the supernatant to be collect in the waste removal zone 32 and removed without removing any part of the pellet. The waste removal zone 32 may be coupled to the thin-walled channels through a channel arm disposed at a 90 degree angle to enable the removal of waste directly from the zone to the waste removal port 28. The waste removal zone 32 may directly adjacent to the 90 degree angle join, to enable waste collection during centrifugation.

Similarly, the pellet removal ports 30 may be connected to the pellet accumulation zone 34 via walled columns in the interior of the centrifuge tube system 12. The walled columns in the interior of the centrifuge system connecting the pellet removal ports to the pellet accumulation zone 34 may be approximately 0.5 mm-0.7 mm (or wider) in diameter to enable the desired sample product (e.g., pellet) to transfer from the pellet accumulation zone to the one or more pellet removal ports 30. The inner centrifuge tube 14 may include an elbow joint at acute angles of the tube to enable pellet accumulation in the inner centrifuge tube 14 during the centrifuging process in a fixed-angle rotor centrifuge. The elbow join may be connected to the pellet accumulation zone 34 via an arm of approximately 1 mm-5 mm in length to enable accumulation of the pellet washing located in the pellet accumulation zone 34. The angle of the elbow joint may depend on the type of rotor used for the centrifugation of the sample, so that the pellet accumulation zone 34 corresponds to the design of the centrifuge used. The pellet accumulation zone 34 may have a volume of approximately 100 µl-1200 µl, which facilitates the concentration of the sample in the pellet volume formed during the centrifuging process. This zone is separated from the superjacent liquid (e.g., supernatant) by draft angles of 100-120 degrees between the pellet accumulation zone 34 and the waste accumulation zone 32, enabling the pellet accumulation zone to be located just below the height of the waste accumulation zone 32. This allows for the complete removal of supernatant without significant effect on the pellet. The presence of internally connecting channels further enables the pellet manipulation and liquid handling without opening the tube as detailed above.

The inner centrifuge tube 14 may also include a vertical funneling zone 38 that may enable targeted maneuvering of the samples under centrifugal force along the side walls of the tube. This may be fluidically connected to a horizontal pellet funneling zone 36 present at the bottom of the inner centrifuge tube 14. The horizontal funneling zone 36 may direct the vertically pelleted sample via fluids in the inner centrifuge tube 14 towards the sides of the tube adjacent to the pellet accumulation zones 34. The horizontal pellet funneling zone 36 includes sharp draft angles (e.g., 100-120 degrees) as discussed above, to enable a funneling effect that mediates the separation of the pellet and the supernatant volumes. The horizontal pellet funneling zone 36 affects the volume (hence, the concentration) of the resulting pellet suspension. The combination of the funneling and pellet accumulation zone functions to pin the pellet to the same location, such that the supernatant and pellet removal port opening are always in the correct geometric location with respect to the pellet for sample manipulation and extraction. The two zones also enable centrifugation at lower speeds than in a typical centrifuge tube (in which the pellet must be accumulated in a pointed structure at the bottom of the tube to enable manipulation with a standard pipette tip), but still maintain an intact pellet for manipulation by insertion and extraction of liquid using the external ports and connected opening within the tube.

The process of collecting a pellet sample via utilizing a centrifuge is detailed below. The process may involve depositing a sample into the inner centrifuge tube 14 and centrifuging and adding additional solutions to the tube to enable pellet sample collection.

Figure 4:
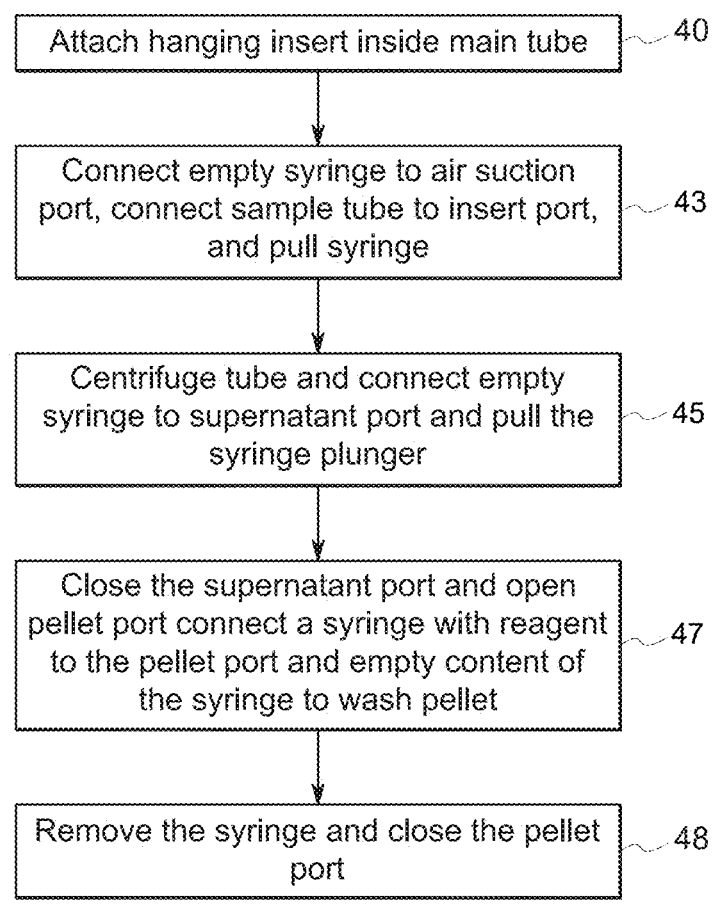
FIG. 4 depicts a flow diagram of sample preparation using the closed system centrifuge tube, in accordance with embodiments of the present disclosure.

For example, FIG. 4 depicts a flow diagram of sample preparation of the closed system centrifuge tube 12, in accordance with embodiments of the present disclosure. The closed system may enable insertion and preparation of the sample without exposure of the sample to the outside environment.

At process block 40, the hanging insert 24 may be inserted (e.g., screwed) into the inner centrifuge tube 14. The tube may be a 50 mL conical tube or any other suitable tube size. At process block 43, an empty syringe device may be connected to an air suction port of the one or more ports 18 of the closed system centrifuge tube 12. A vacutainer or a similar holder may contain a sample (e.g., blood sample) that may be connected via a tube to the sample inlet port 26. The syringe plunger may be pulled out of the syringe to create negative pressure. This may enable the sample to be displaced to the inner centrifuge tube 14. The syringe may then be disconnected from the closed system centrifuge tube 12.

At process block 45, the closed system centrifuge tube 12 may be centrifuged, and then a syringe may be connected to the supernatant port of the one or more ports 18. The one or more ports 18 other than the supernatant port and vent holes of the tube may be blocked off using external caps 20 and/or another blocking mechanism. The syringe plunger is then pulled outward to remove the supernatant from the closed system centrifuge tube 12. The closed system centrifuge tube 12 may include a line marking or indication of when to stop removing the supernatant via the syringe.

In process block 47, the supernatant port may be closed utilizing external cap 20 after the proceeding step of supernatant removal. The pellet port may then be opened by removing external cap 20, and a syringe may be connected to the pellet port of the one or more ports 18. The syringe may be pre-filled with a suitable reagent associated with the sequence of washing steps (e.g., cell media, saponin, water). The reagents in the syringe may be emptied into the inner centrifuge tube 14 to wash the sample pellet. In process block 48, the syringe may be removed after the washing of the pellet by injecting the reagent in the syringe into the inner centrifuge tube 14. The sample may then be centrifuged additionally and/or the process repeated with other samples. The pellet extraction port may serve at this step as the sample injection port. The opening of the port in the tube is positioned directly under the pellet accumulation zone, such that liquid/wash buffer injection serves to push the pellet back in to the centrifugation tube, breaking the pellet up, and mixing it into the wash buffer. This serves to replace a conventional manual step for pellet washing in standard tubes, without the need to open the tube for access with a pipette tip.

The closed system centrifuge tube 12 may include multiple variations or embodiments that can enable a closed system for waste removal of excess reagents and solutions during the centrifugation process. This may limit pellet disruption during waste removal, and improve final pellet/sample concentration and collection efficiency.

Figure 5:
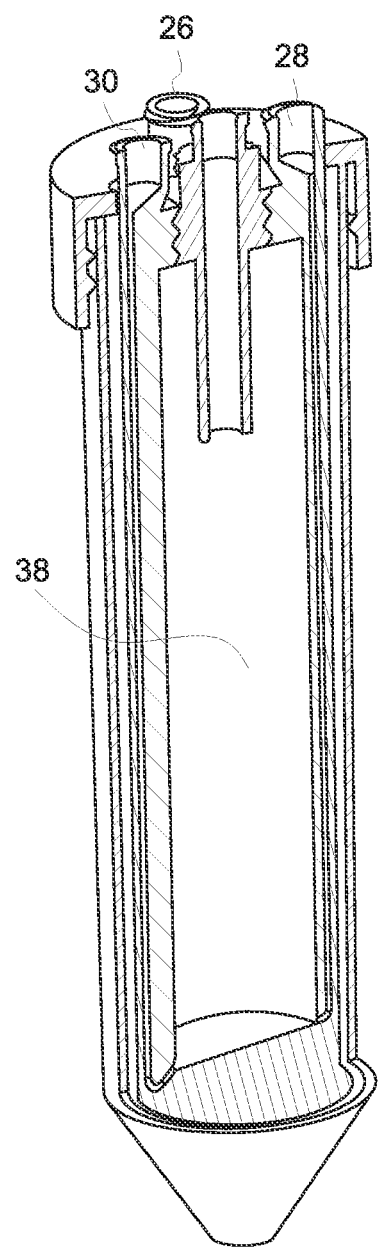
FIG. 5 depicts an embodiment of a waste removal system, a pellet removal port, and a sample inlet port of the closed system centrifuge tube, in accordance with embodiments of the present disclosure.

With the preceding in mind, FIG. 5 depicts an embodiment of the waste removal port 28, pellet removal/reagent inlet port 30, and the sample inlet port 26 of the closed system centrifuge tube 12, in accordance with an embodiment of the present disclosure. These ports may enable removal of sample and/or waste and insertion of reagents without exposing the sample to the outside environment.

The waste removal port 28 may include an external port coupled to the main body of the inner centrifuge tube 14. The waste removal port 28 may be suitable for removal of fluids via the syringe method described above in FIG. 4. The pellet removal port 30 and the reagent inlet port may also be coupled to the inner centrifuge tube 28. The removal port and reagent inlet port 30 may be part of the one or more ports 14 disposed on the top end of the inner centrifuge tube 14. The pellet removal port and the reagent inlet port 30 may each be attached for sample insertion and reagent insertion respectively. Further, the sample inlet port 26 may include a vertical pellet funneling zone 38 that includes a cylindrical chamber coaxial with the inner centrifuge tube 14. The vertical pellet funneling zone 38, may include symmetrical vertical side walls that do not include any structural roughness so the vertical pellet funneling zone 38 may reduce shear friction during the centrifugation process.

Figure 6:
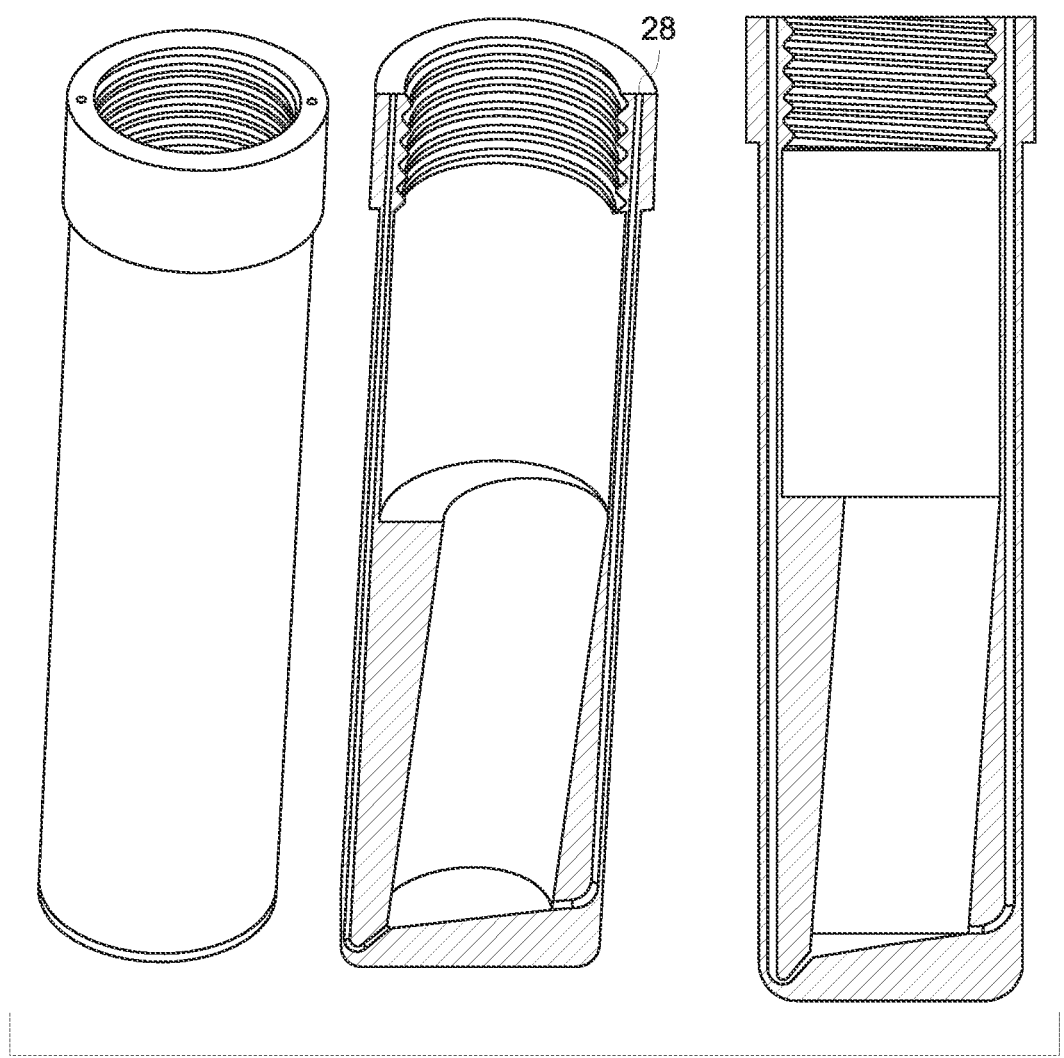
FIG. 6 depicts a further embodiment of the waste removal system of the closed system centrifuge tube, in accordance with embodiments of the present disclosure.

With the preceding in mind, FIG. 6 depicts a further embodiment of the waste removal port 28 of the closed system centrifuge tube 12, in accordance with an embodiment of the present disclosure. These ports may enable removal of sample and/or waste and insertion of reagents without exposing the sample to the outside environment. The waste removal port 28 may include a small hole that may be accessed by a needle, tubing, capillary, or any other small insertion device for removal of reagents. In addition to the multiple waste removal port 28 embodiments, the pellet removal port 30 may include multiple embodiments for the pellet removal.

Figure 7:
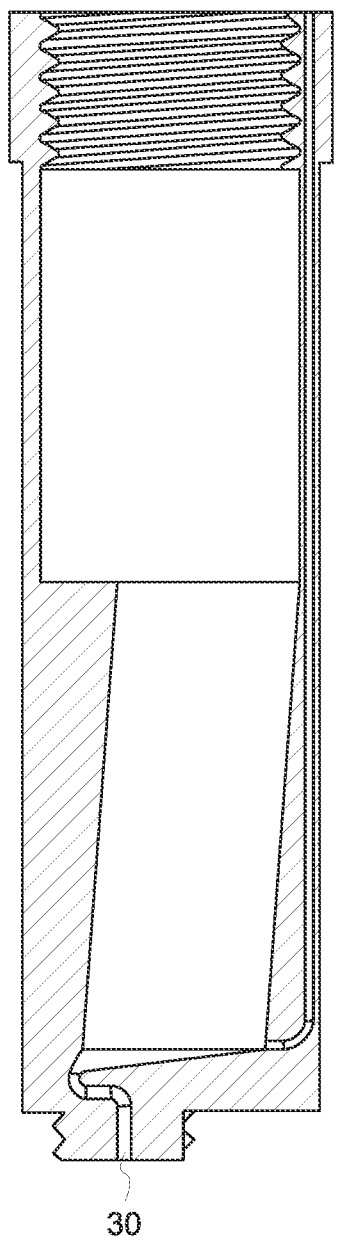
FIG. 7 depicts an additional embodiment of the pellet removal port of the closed system centrifuge tube, in accordance with embodiments of the present disclosure.
Figure 8:
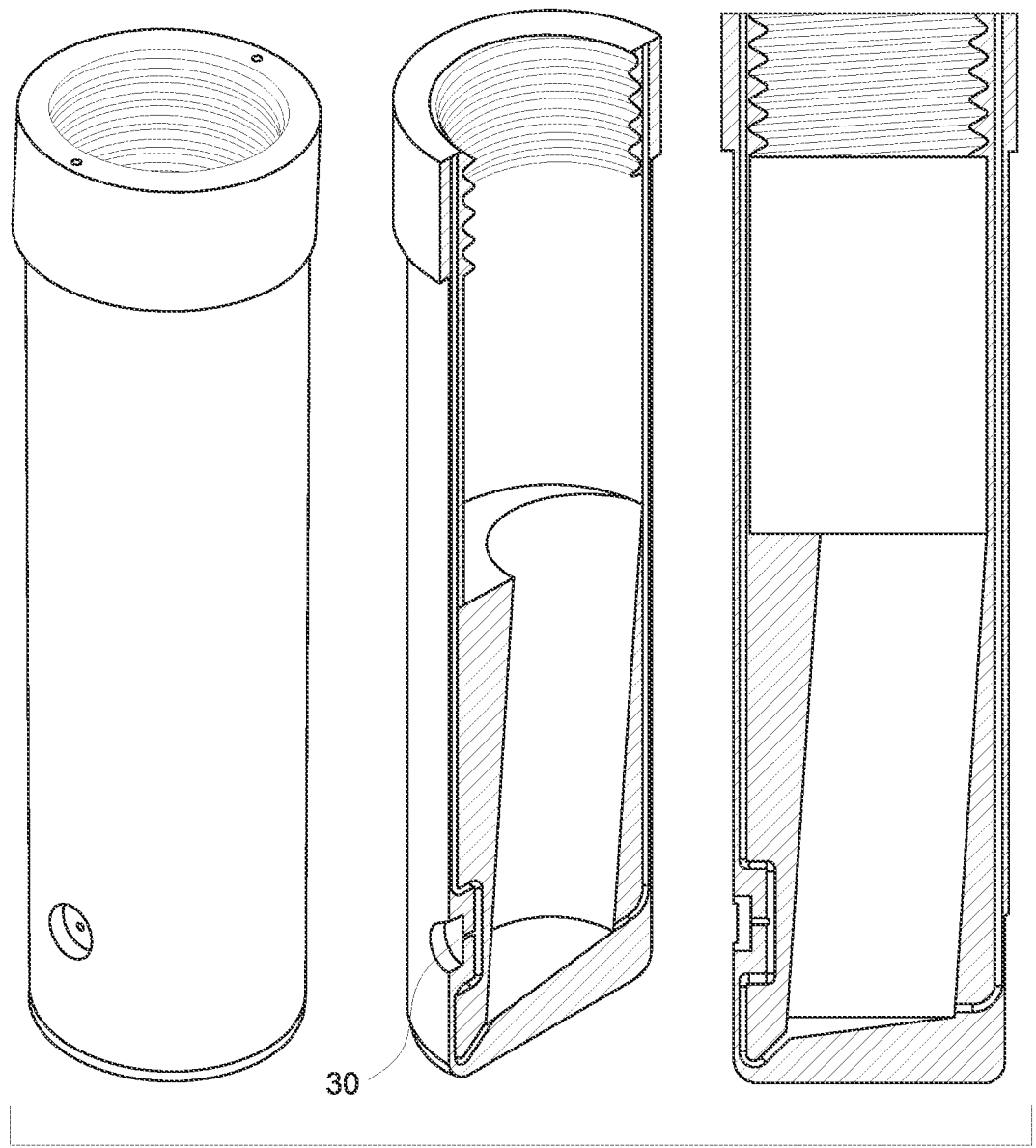
FIG. 8 depicts another embodiment of the pellet removal port of the closed system centrifuge tube, in accordance with embodiments of the present disclosure.
Figure 9:
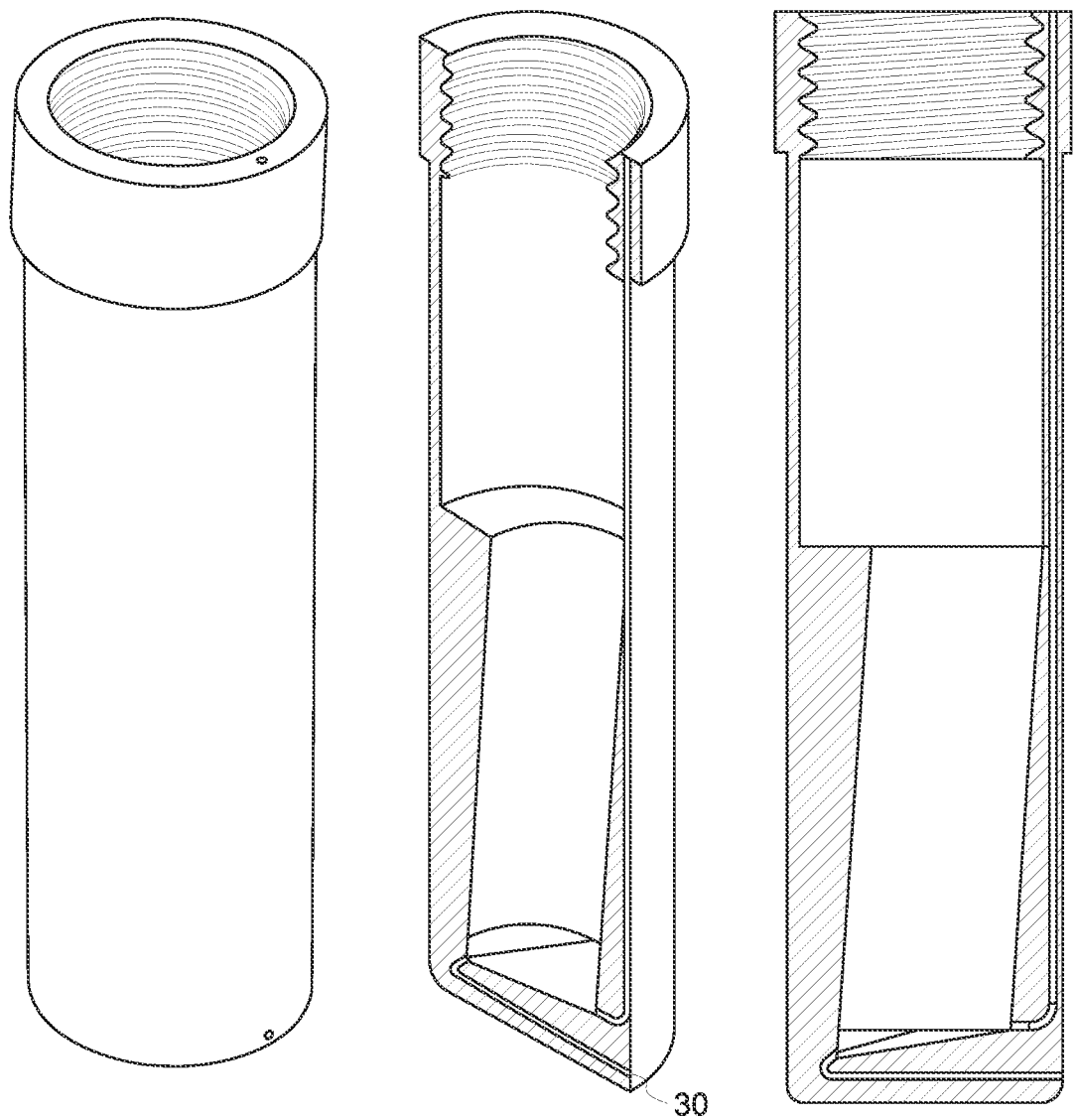
FIG. 9 depicts a further embodiment of the pellet removal port of the closed system centrifuge tube, in accordance with embodiments of the present disclosure.

FIG. 7 depicts an additional embodiment of the pellet removal port 28 of the closed system centrifuge tube 12, in accordance with an embodiment of the present disclosure. The embodiment may include a small hole covered by a self-healing polymer or other resealable material at the bottom of the inner centrifuge tube, which may be accessed by any small liquid removal device (e.g., needle, tubing, capillary). This embodiment may facilitate a shorter path for fluid handling (hence, reduced dead volume) and enable proximity to the pellet accumulation zone for pellet removal. Further, FIG. 8 depicts another embodiment of the pellet removal port 28 of the closed system centrifuge tube 12, in accordance with an embodiment of the present disclosure. The pellet removal port 28 may be disposed on the side of the inner centrifuge tube 14, such as near the bottom of the tube. As discussed in FIG. 7 above, the small hole may be sized to allow removal of the pellet by any small liquid removal device (e.g., needle, tubing, capillary). The location of the pellet removal port 28 on the side of the inner centrifuge tube 14 may enable a shunt path to be created for fluid handling, and may enable convenient access to the pellet accumulation zone 34 to enable pellet removal. FIG. 9, depicts a further embodiment of the pellet removal port 28 of the closed system centrifuge tube 12, in accordance with an embodiment of the present disclosure. The pellet removal port in this embodiment may be accessed by a needle, tubing, capillary, or any other small insertion device. This embodiment may enable a shunt path for fluid handling and may provide proximity to the pellet accumulation zone 34 for pellet removal and/or insertion.

Figure 10:
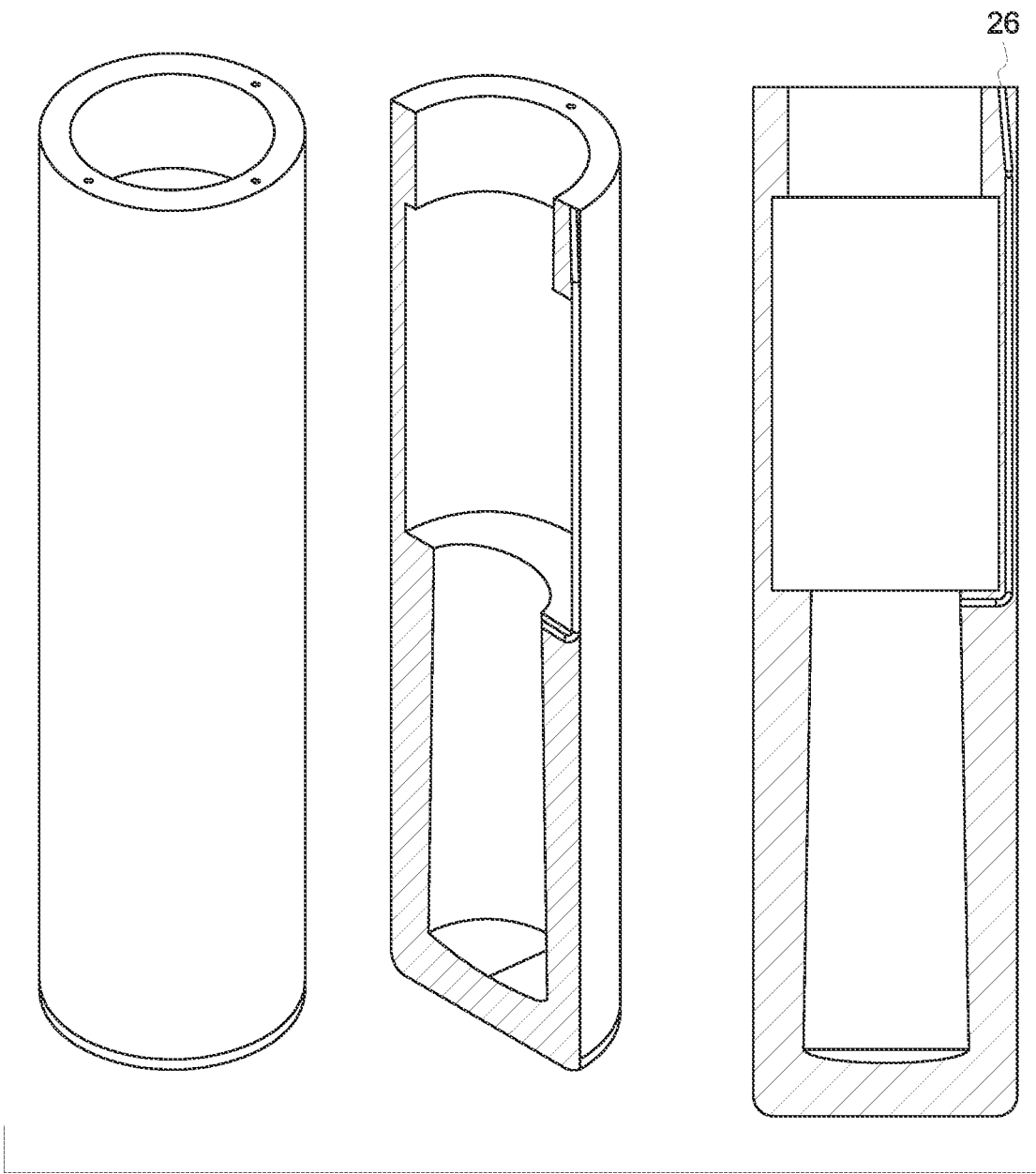
FIG. 10 depicts an additional embodiment of the sample inlet port of the closed system centrifuge tube, in accordance with embodiments of the present disclosure.
Figure 11:
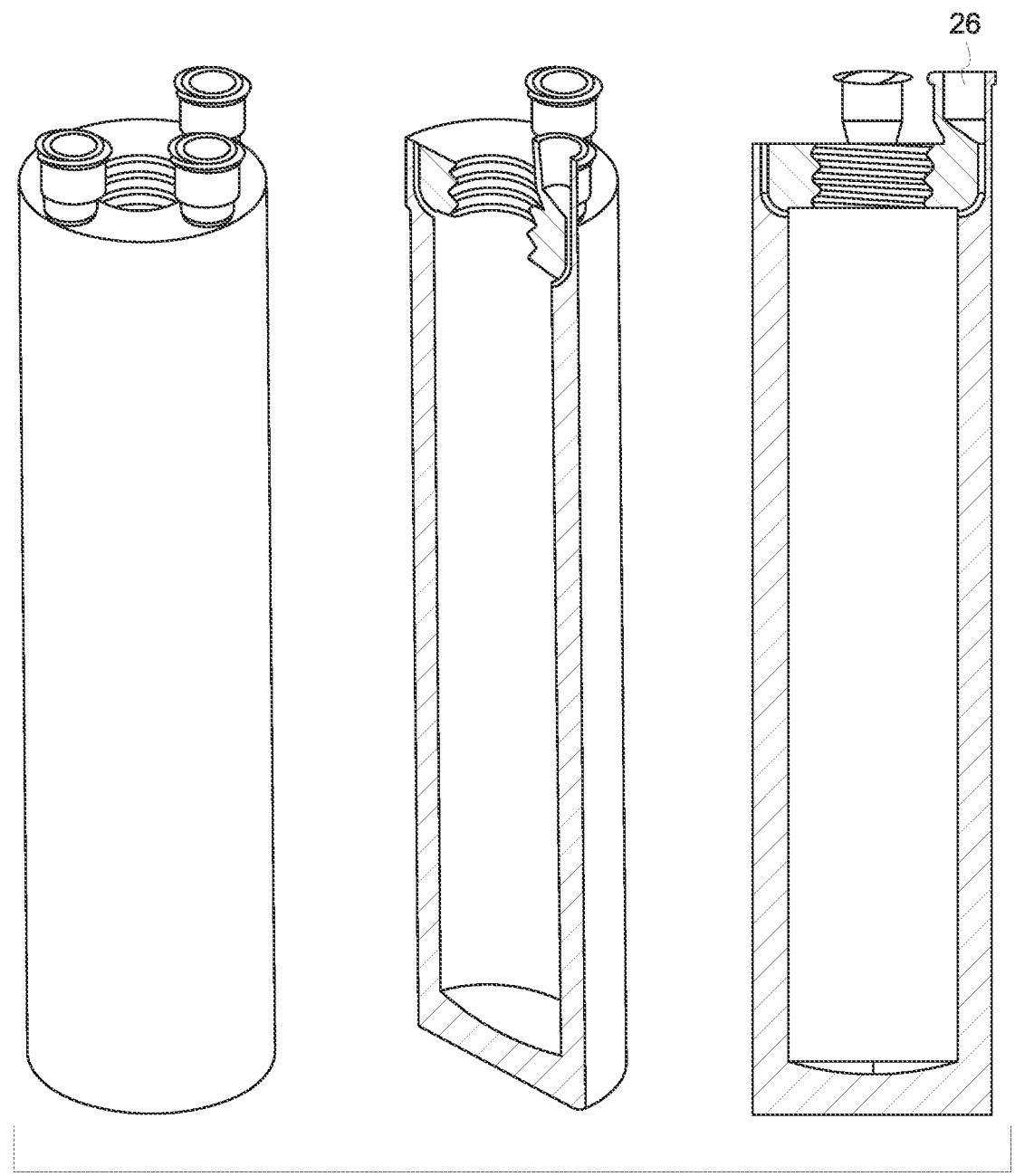
FIG. 11 depicts another embodiment of the sample inlet port of the closed system centrifuge tube, in accordance with embodiments of the present disclosure.

With the preceding in mind, FIG. 10 depicts an additional embodiment of the sample inlet port 26 of the closed system centrifuge tube 12, in accordance with an embodiment of the present disclosure. The sample inlet port 26 may be disposed at the top of the tube in the form of a small hole and may be connected to the inner centrifuge tube 14 via a microchannel embedded within the inner centrifuge tube 14. The sample inlet port 26 may be accessed by a needle, tubing, capillary, or any other small insertion device. Further, FIG. 11 depicts another embodiment of the sample inlet port 26 of the closed system centrifuge tube 12, in accordance with an embodiment of the present disclosure. This embodiment may include a sample inlet port 26 disposed at the top of the closed system centrifuge tube 12 and may include a connection to a microchannel embedded within the inner centrifuge tube 14. The sample inlet port 26 may be accessed by a needle, tubing, capillary, or any other small insertion device.

Figure 12:
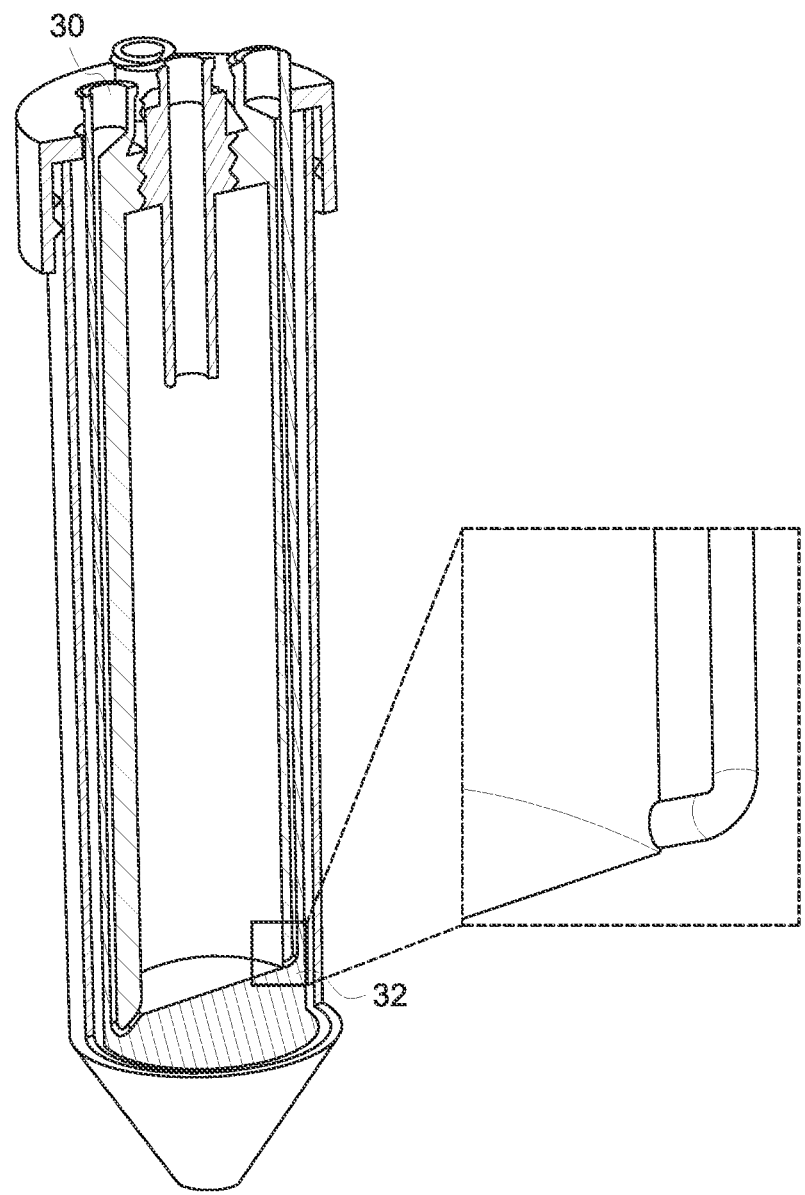
FIG. 12 depicts an embodiment of a waste removal zone of the closed system centrifuge tube, in accordance with embodiments of the present disclosure.

FIG. 12 depicts an embodiment of a waste removal zone of the closed system centrifuge tube 12 in accordance with an embodiment of the present disclosure. The waste removal zone 32 may allow for isolated accumulation of waste in a section separate from the pellet accumulation zone.

Figure 13:
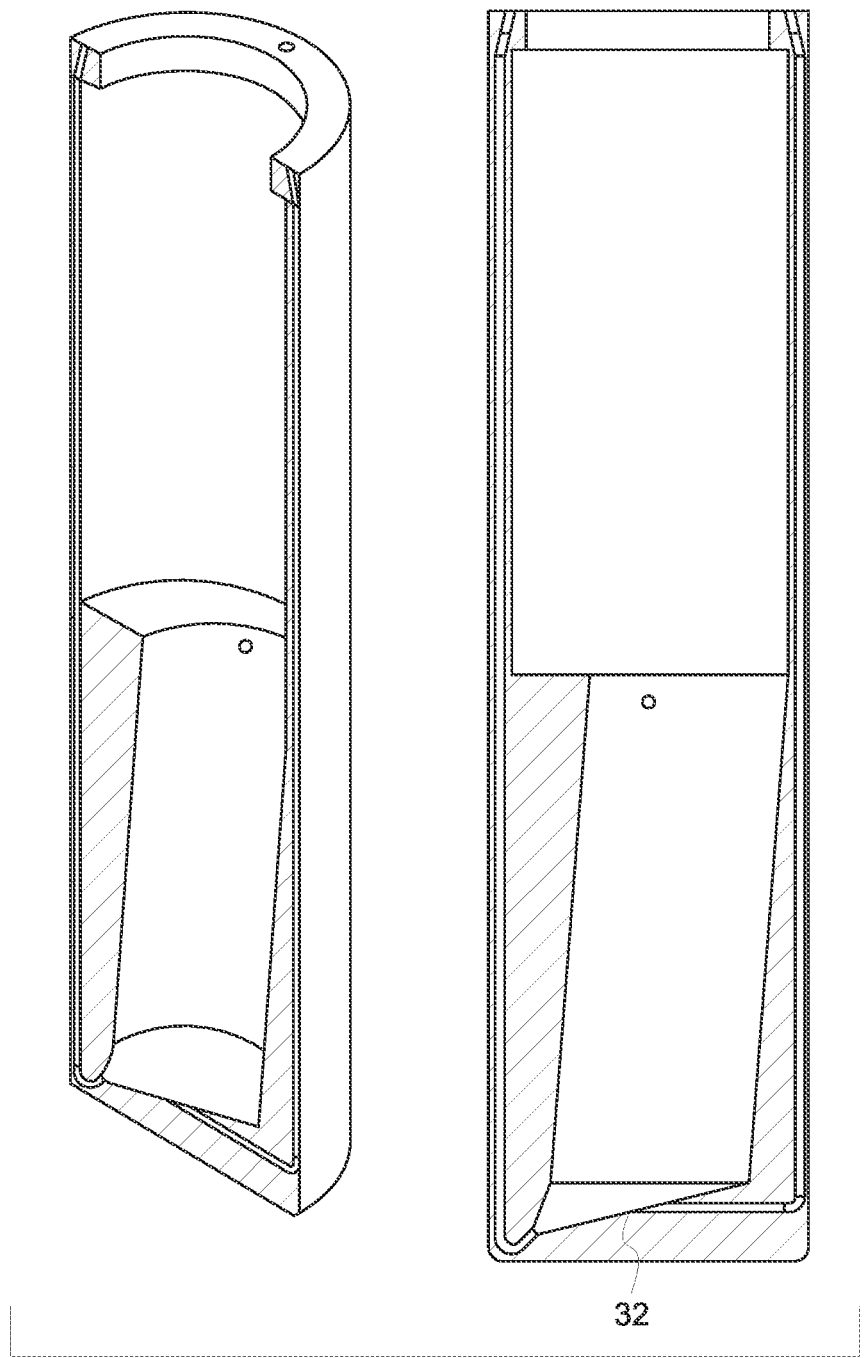
FIG. 13 depicts a further embodiment of the waste removal zone of the closed system centrifuge tube, in accordance with embodiments of the present disclosure

The waste removal zone 32 may include a microchannel opening near the bottom of the inner centrifuge tube a specific linear distance away from the (e.g., adjacent to but separated from) pellet accumulation zone 34, and on the opposite side of the tube. The waste removal zone may be disposed at a height above the pellet removal zone due to draft angles connecting the waste removal zone and the pellet removal zone. This may enable the pellet to be isolated from the suction of the waste when the waste is removed from the waste removal zone 32 and thereby enable a specified volume of liquid to remain over the pellet after waste removal. The microchannel may be embedded within the waste removal zone 32 wall. The microchannel may include a 90-degree elbow joint adjacent to the waste removal zone 32 and may be coupled to the waste removal port 28 disposed at the top of the inner centrifuge tube 14. The 90-degree elbow enables pellet accumulation/entrapment in a small microchannel section directly below the pellet accumulation zone, and additional protection of the pellet during processing. Additionally, FIG. 13 depicts a further embodiment of the waste removal zone 32 of the closed system centrifuge tube 12 in accordance with an embodiment of the present disclosure. The waste removal zone 32 may include a microchannel, as in FIG. 12, along with an opening located near the bottom of the inner centrifuge tube 14. The opening may be located in the middle of the horizontal pellet funneling zone 36 close to the pellet, to enable a higher quantity of waste volume removal which may enable a more concentrated pellet sample and reduce the excess pellet volume.

Figure 14:
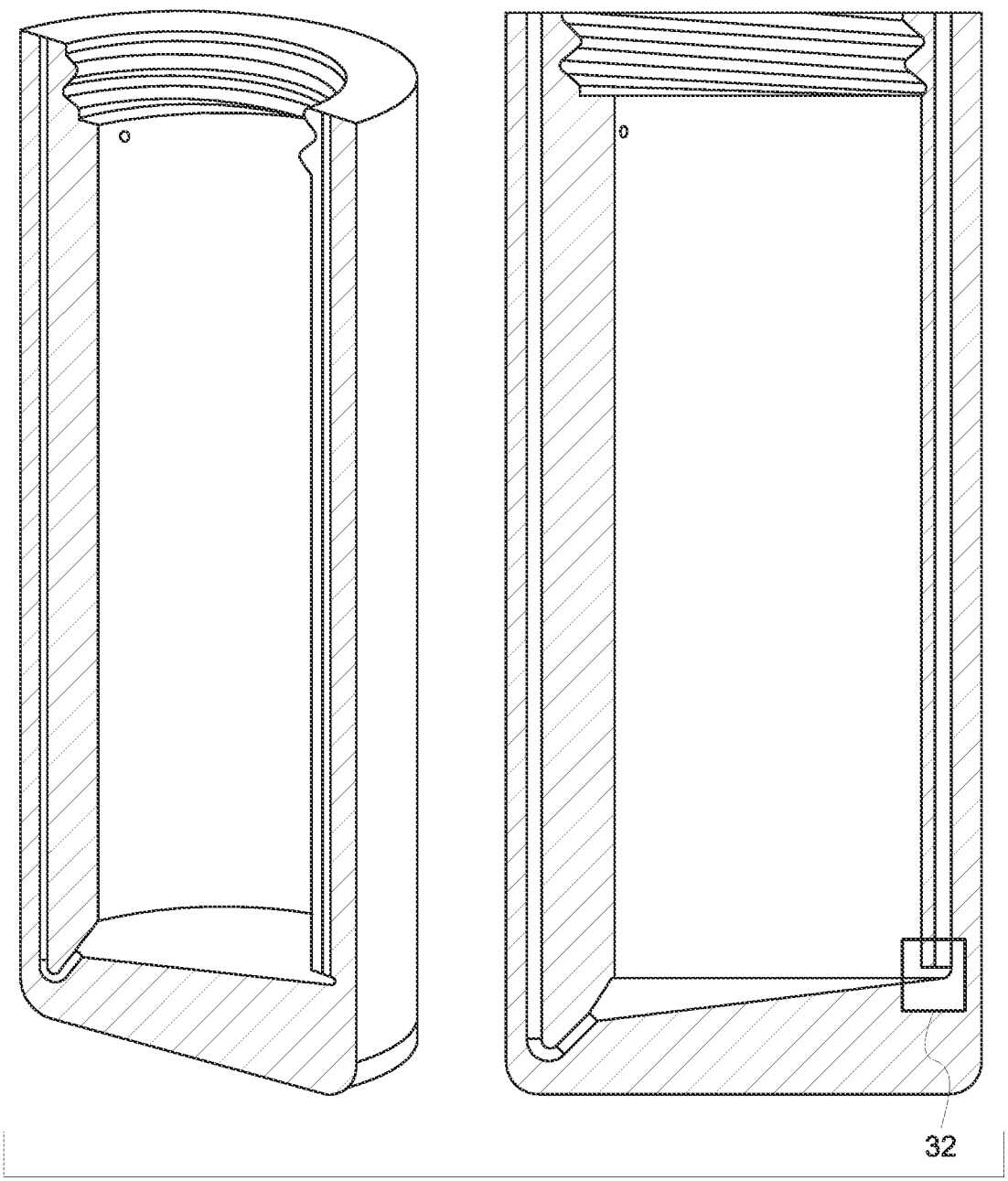
FIG. 14 depicts an additional embodiment of the waste removal zone of the centrifuge tube, in accordance with embodiments of the present disclosure.

Based on the preceding, FIG. 14 depicts an additional embodiment of the waste removal zone 32 of the of the closed system centrifuge tube 12, in accordance with an embodiment of the present disclosure. The waste removal zone 32 may allow for isolated accumulation of waste in a section separate from the pellet accumulation zone. The waste removal zone 32 may include the a microchannel disposed near the bottom of the inner centrifuge tube apposed from the pellet accumulation zone 34 to isolate the pellet from the waste removal suction, as discussed above in FIG. 7. The microchannel may not include an elbow joint, and may be embedded in thin walls (e.g., 0.2 mm-0.7 mm) of the tube which enables the internal sample volume to increase. In addition to the waste removal zone 32, the closed system centrifuge tube 12 may include the pellet accumulation zone 34, as discussed above.

Figure 15:
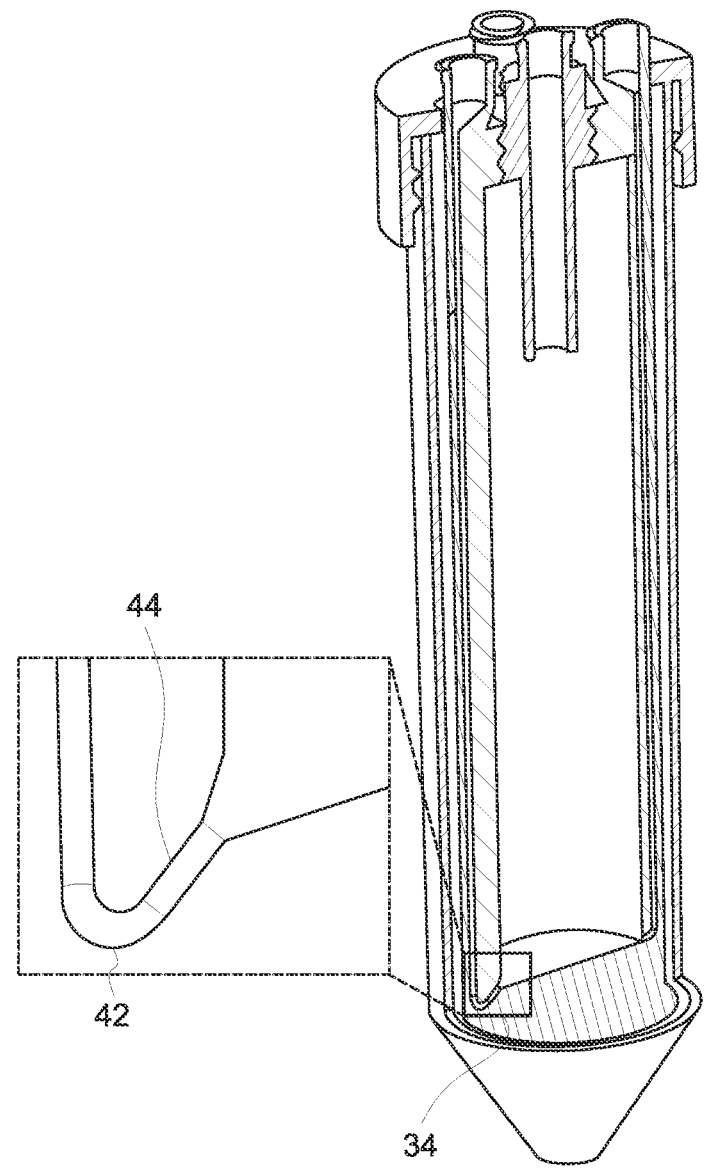
FIG. 15 depicts an embodiment of a pellet accumulation zone of the centrifuge tube, in accordance with embodiments of the present disclosure.

FIG. 15 depicts an embodiment of the pellet accumulation zone 34 of the closed system centrifuge tube 12, in accordance with an embodiment of the present disclosure. The pellet accumulation zone 34 may include a microchannel opening near the bottom of the closed system centrifuge tube 12 asymmetrically located to the side of the horizontal pellet funneling zone 36. The microchannel may be embedded in the closed system centrifuge tube 12 wall and may include an acute-angled elbow joint 42 with a short length collecting arm (e.g., 2 mm-5 mm) 44 disposed at an acute-angle to the microchannel opening in the inner centrifuge tube 14. The microchannel may be connected to the pellet removal port 30 disposed at the top of the inner centrifuge tube 14 and in communication with the pellet accumulation zone.

Figure 16:
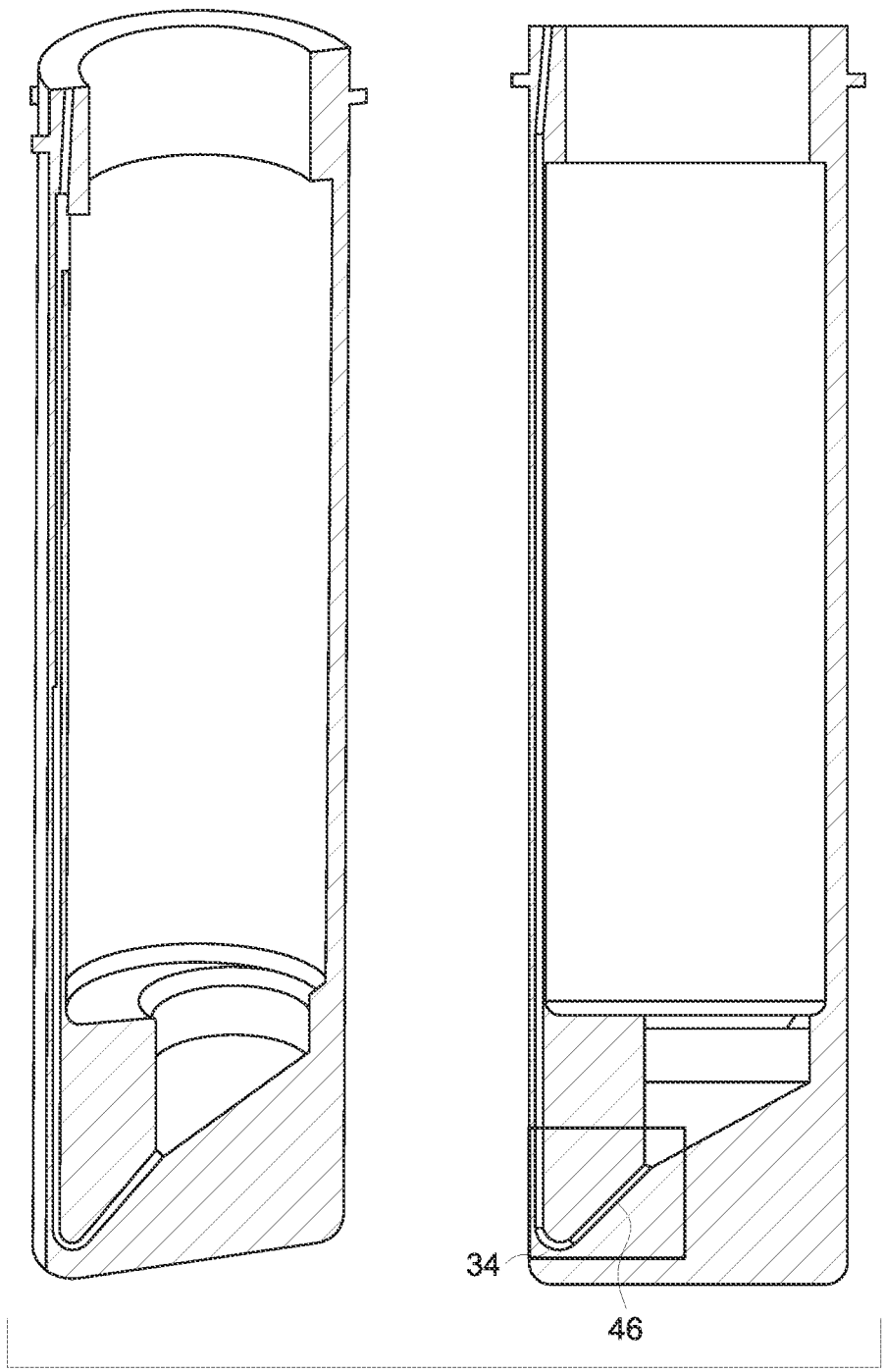
FIG. 16 depicts a further embodiment of the pellet accumulation zone of the centrifuge tube, in accordance with embodiments of the present disclosure.
Figure 17:
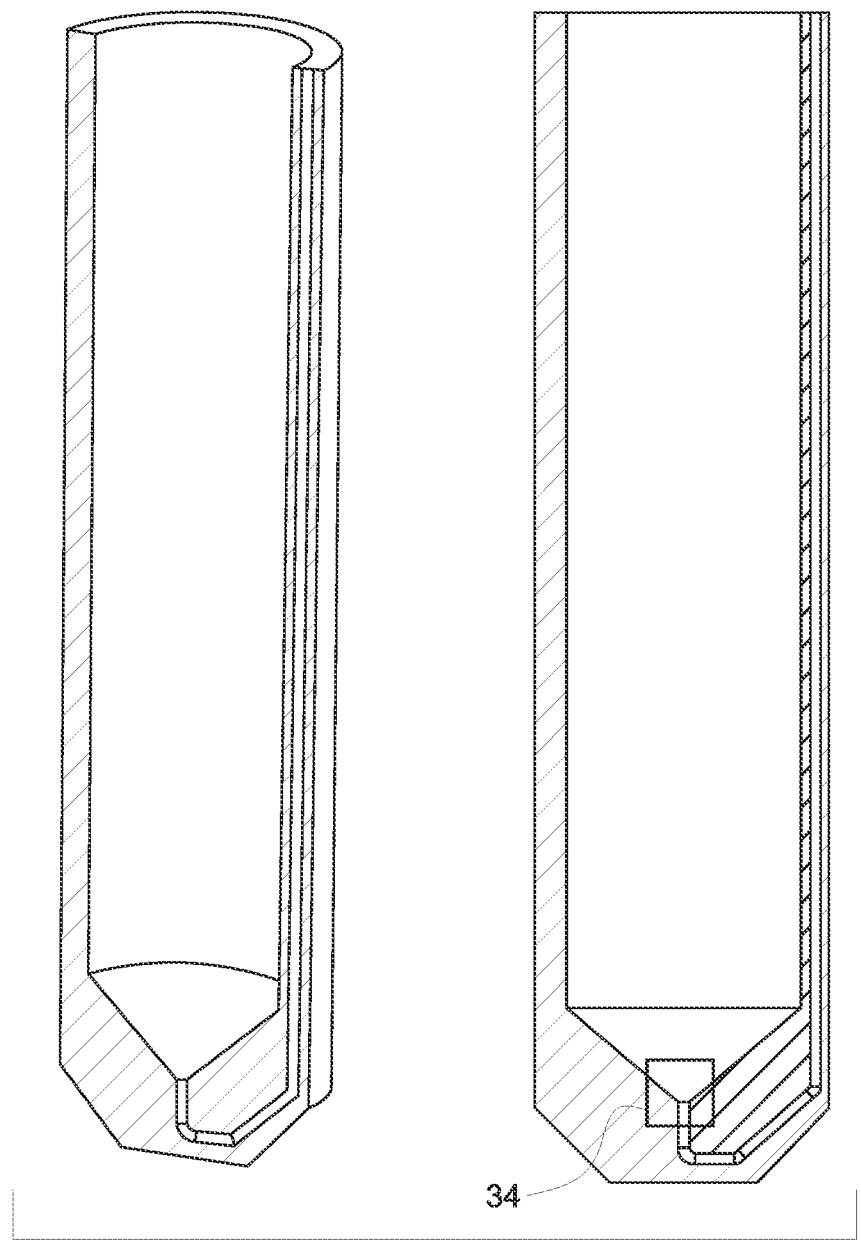
FIG. 17 depicts an additional embodiment of the pellet accumulation zone of the closed system centrifuge tube, in accordance with embodiment of the present disclosure.

Additionally, FIG. 16 depicts a further embodiment of the pellet accumulation zone 34 of the closed system centrifuge tube 12, in accordance with an embodiment of the present disclosure. The pellet accumulation zone 34 may include a microchannel that includes an elbow joint 42 connected to an extended collecting arm (e.g., 2 mm-5 mm) 46. The extended collecting arm 46 may enable enhanced segregation of the pellet from the excess fluid in the inner centrifuge tube 14. Further, FIG. 17 depicts an additional embodiment of the pellet accumulation zone 34 of the closed system centrifuge tube 12, in accordance with an embodiment of the present disclosure. The pellet accumulation zone 34 may include a microchannel without the elbow joint 42 that is located symmetrically at the bottom of the horizontal pellet funneling zone 36 and located coaxial with the inner centrifuge tube 14. This embodiment of the pellet accumulation zone 34 may enable the closed system centrifuge tube 12 to be used in a swing-bucket rotor centrifuge device. As discussed above, the closed system centrifuge tube 12 may include the vertical pellet funneling zone 38 for isolation of a pellet (e.g., sample) at the bottom of the inner centrifuge tube 14.

Figure 18:
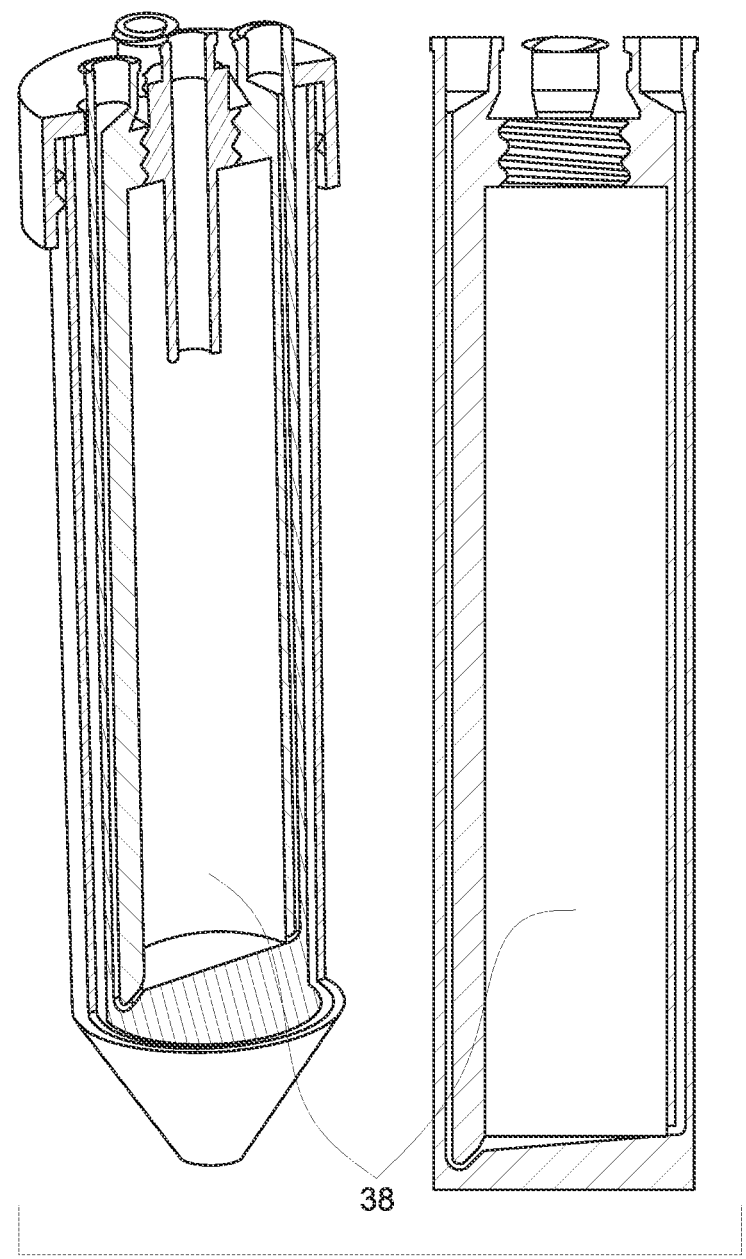
FIG. 18 depicts an embodiment of the vertical funneling zone of the closed system centrifuge tube, in accordance with embodiment of the present disclosure.

FIG. 18 depicts an embodiment of the vertical funneling zone 38 of the closed system centrifuge tube 12, in accordance with an embodiment of the present disclosure. The vertical funneling zone 38 may be disposed in the inner centrifuge tube 14 and may take the form of a cylindrical chamber coaxial with the closed system centrifuge tube 12. The vertical funneling zone may include symmetrical vertical side walls that lack structural roughness to mitigate shear friction and preventing sample-loss due to wall-adsorption that may be caused during centrifugation of the sample.

Figure 19:
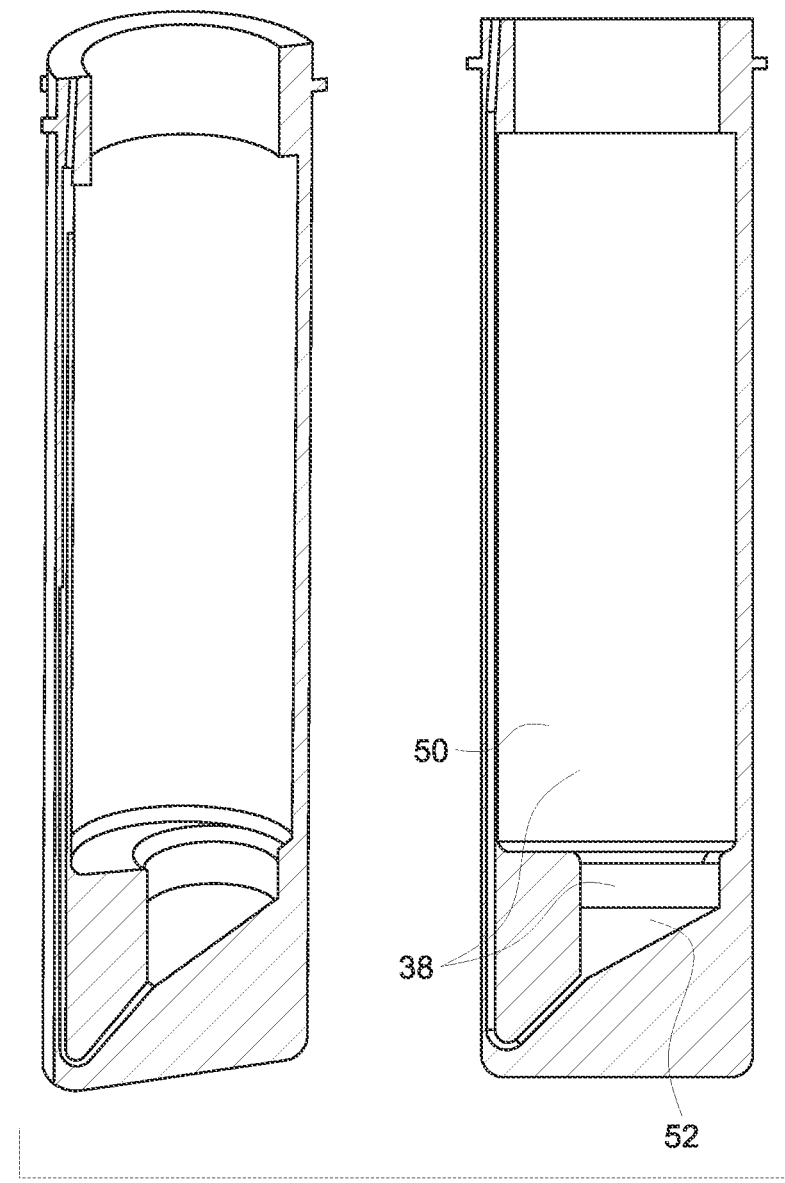
FIG. 19 depicts another embodiment of the vertical funneling zone of the closed system centrifuge tube, in accordance with embodiment of the present disclosure.
Figure 20:
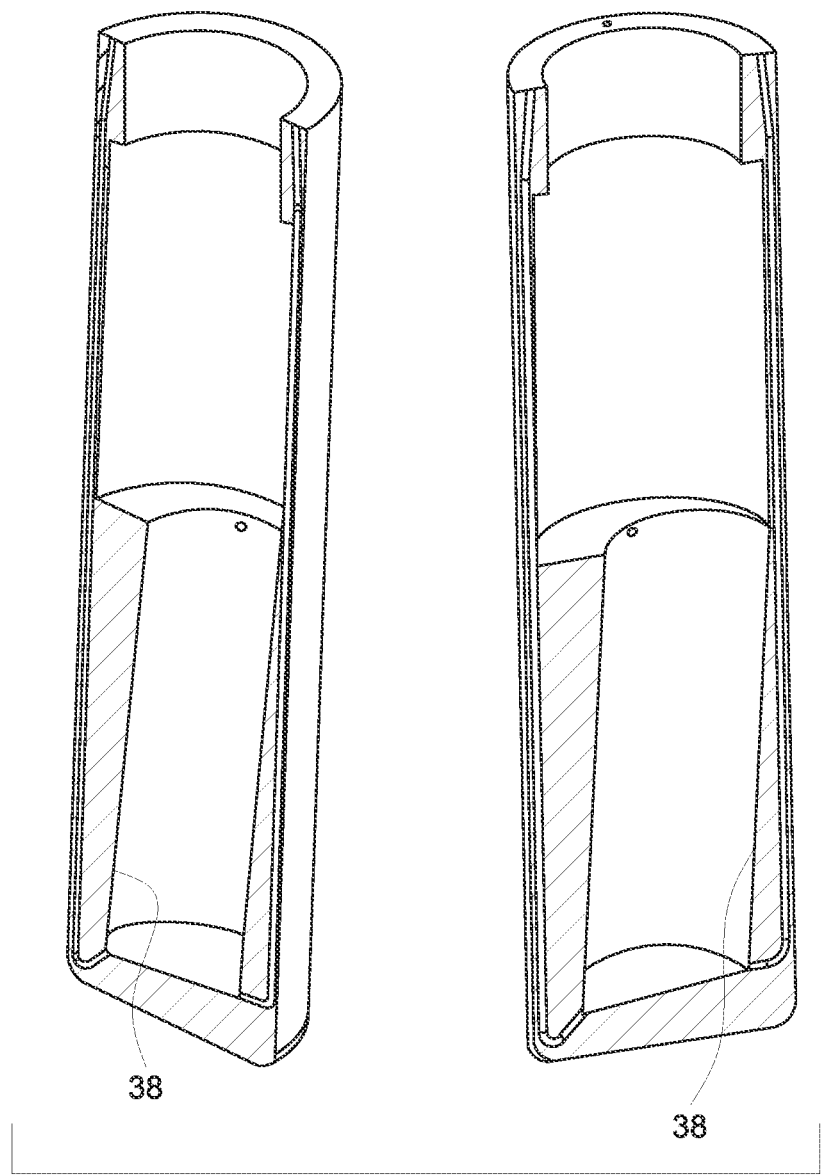
FIG. 20 depicts a further embodiment of the vertical funneling zone of the closed system centrifuge tube, in accordance with embodiment of the present disclosure.

Further, FIG. 19 depicts another embodiment of the vertical funneling zone 28 of the closed system centrifuge tube 12, in accordance with an embodiment of the present disclosure. This embodiment includes a vertical pellet funneling zone 38 that may include a primary chamber 50 and a secondary chamber 52 consisting of unequal volumes. The secondary chamber 52 may be the bottommost chamber and may also include a lower volume relative to the primary chamber 50. The sample chamber and waste chamber may hold 10 mL-40 mL when using a 50 mL centrifuge tube outer casing. The secondary chamber's 52 lower volume relative to the primary chamber 50 enables the secondary chamber 52 to funnel the pelleting entities to the pellet accumulation zone 34. Additionally, FIG. 20 depicts a further embodiment of the vertical funneling zone 38 of the closed system centrifuge tube 12, in accordance with an embodiment of the present disclosure. In this embodiment, the vertical pellet funneling zone 38 may include slanted side walls that are slanted at acute angels with the inner centrifuge tube 14 axis. This may enable the sample to experience full centrifugal force during the centrifugation process. The closed system centrifuge tube 12 may also include a horizontal pellet funneling zone to aide in concentrating the pellet during the centrifugation process.

Figure 21:
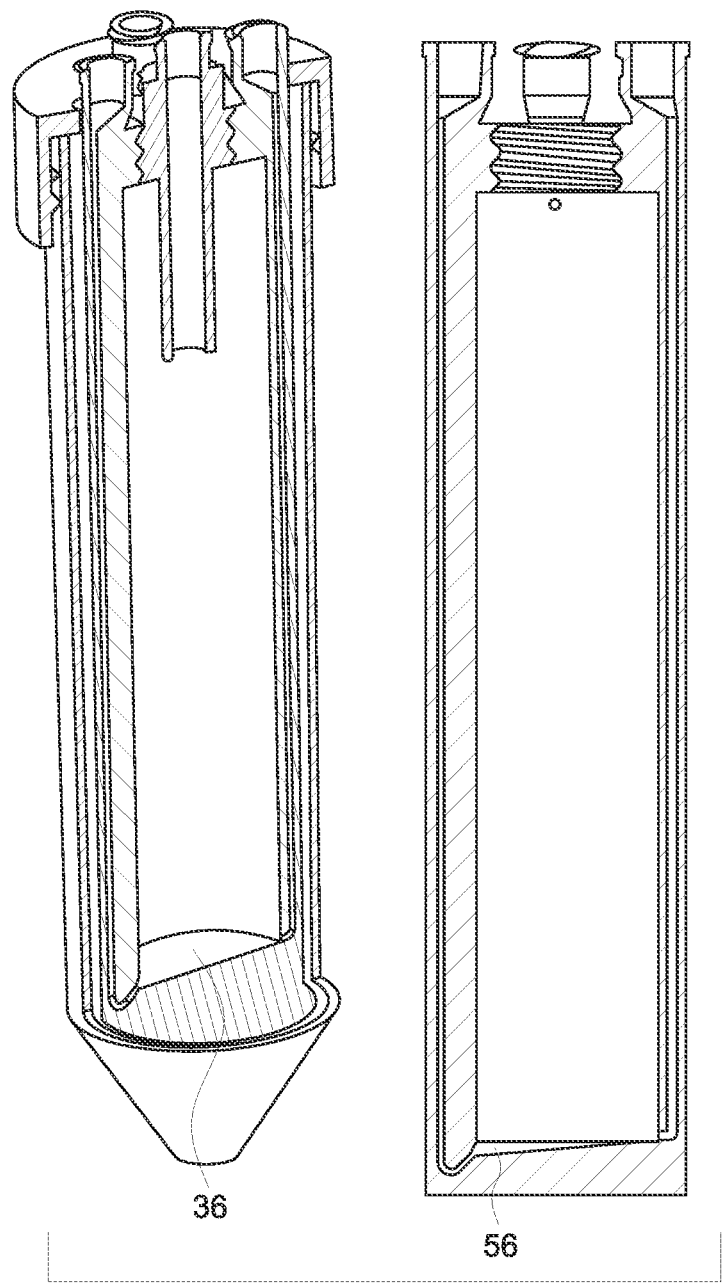
FIG. 21 depicts an embodiment of a horizontal funneling zone of the closed system centrifuge tube, in accordance with embodiments of the present disclosure.

With the preceding in mind, FIG. 21 depicts an embodiment of the horizontal funneling zone 38 of the closed system centrifuge tube 12, in accordance with embodiments of the present disclosure. The horizontal funneling zone 38 may consist of a small asymmetrically lofted component 56 near the bottom of the tube. The lofted component 56 may include draft angles and may be able to contain a volume of around 0.1 mL-0.5 mL or any other suitable volume. The volume of this region may be adjusted based on altering the draft angles of the lofted component 56. This lofted component 56 may correspond to the pellet retention volume.

Figure 22:
FIG. 22 depicts an additional embodiment of the horizontal funneling zone of the closed system centrifuge tube, in accordance with embodiments of the present disclosure.

Additionally, FIG. 22 depicts an embodiment of the horizontal funneling zone 38 of the closed system centrifuge tube 12, in accordance with an embodiment of the present disclosure. In this embodiment the horizontal funneling zone 38 may include a lofted component 56 as described in FIG. 21, but the lofted component 56 may include different draft angles of 100 degrees to 120 degrees and different volumes that may be larger than 100 microliters (e.g., 0.2 mL-5 mL).

The smaller funneling results in large volumes of collection in the lofted component 56 which may increase the pellet retention volume.

Figure 23:
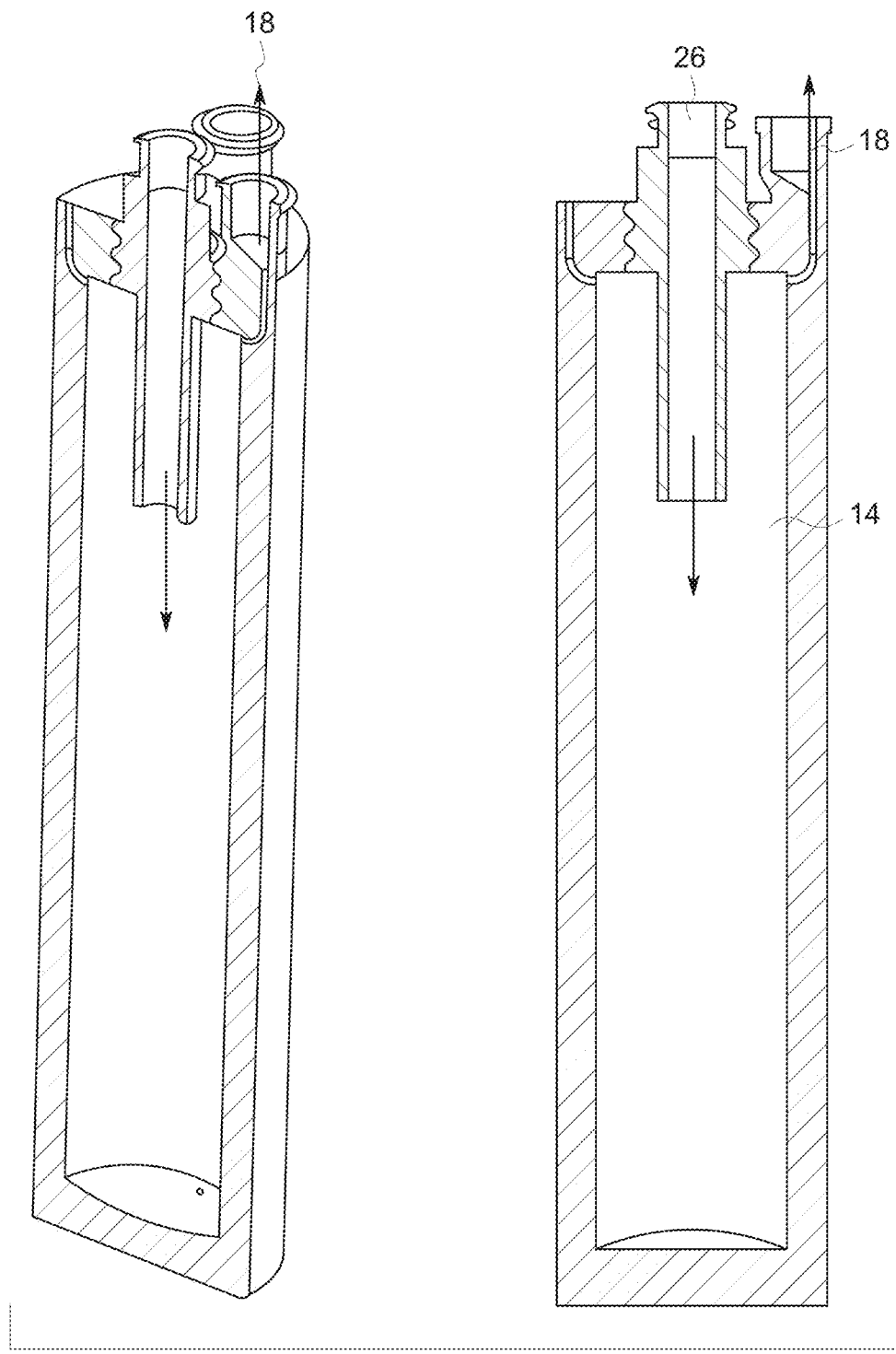
FIG. 23 depicts an embodiment of the one or more ports of the closed system centrifuge tube, in accordance with embodiments of the present disclosure.

As discussed above, for insertion and removal of liquids and/or samples the closed system centrifuge tube 12 may implement one or more ports 18 that include actuation ports and suction ports. FIG. 23 depicts an embodiment of the one or more ports 18 of the closed system centrifuge tube 12, in accordance with an embodiment of the present disclosure. The one or more ports may consist of a standard port disposed at the top of the closed system centrifuge tube 12. The one or more ports 18 may include the sample inlet port 26 that may be connected to a short suction microchannel that opens into the main body of the inner centrifuge tube 14. A syringe needle may be inserted into the one or more ports 18 and when negative pressure (e.g., suction) is created at the port 18 by pulling out a plunger of the syringe, the air inside the inner centrifuge tube 14 may be displaced and the sample may enter the tube via the sample inlet port 26. The other one or more ports 18 of the closed system centrifuge tube 12 may need to be closed during this process to enable the suction to be created that enables the sample to enter the inner centrifuge tube 14. It should be understood that while multiple embodiments have been discussed above for the design of the closed system centrifuge tube 12, any suitable design and procedure may be applied when constructing the tube.

Figure 24:
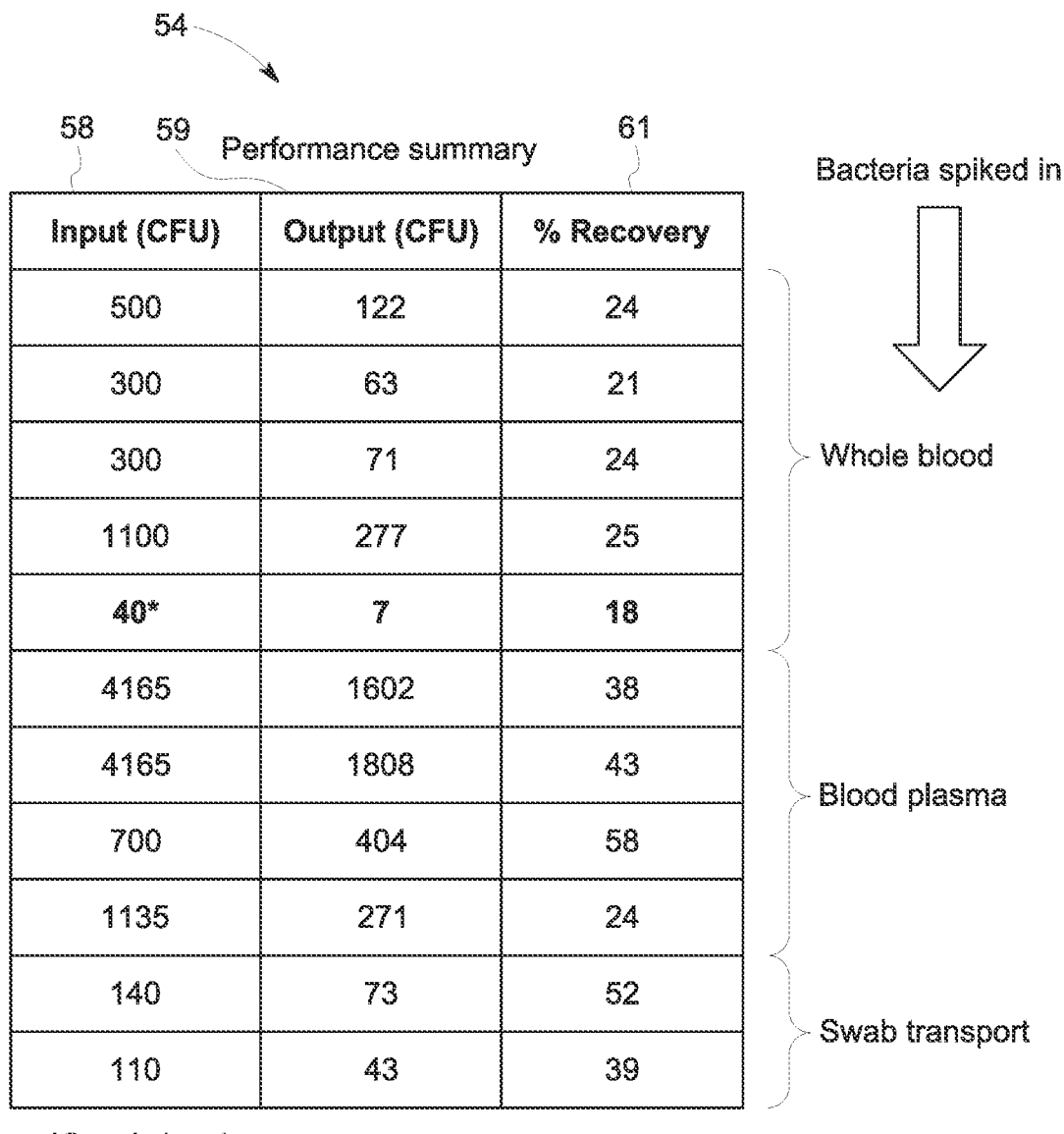
FIG. 24 is a table of performance results using the closed system centrifuge tube for *E. coli* spike-in dextran processing testing.

Additionally, FIG. 24 is a table of performance results using the closed system centrifuge tube 12 of FIG. 3 for *E. coli* spike-in dextran processing testing, in accordance with embodiments of the present disclosure. The sample preparation for the testing included adding 16.8 milliliter (mL) citrate phosphate dextrose (CPD) human whole blood into a vacutainer tube along with 2 microliter (µL) *E. coli* (e.g., about 2,000 Colony-Forming Units (CFU)) to the closed system centrifuge tube 12.

The process for preparation of samples included adding equal volume 2.25% dextran in PBS and 50 millimolar (mM) sodium citrate to the closed system centrifuge tube 12 and incubating for 30 minutes to enable cell separation, the top fraction was then collected from the closed system centrifuge tube 12 using the one or more ports 18. The closed system centrifuge tube 12 was centrifuged for 20 minutes at 2,500 times gravity (×g) at 20 degrees Celsius. The pellet was resuspended in Cation-Adjusted Mueller-Hinton Broth (CAMHB) media and cultured for 0.5 doublings (e.g., time of 0.5 hours) at 37 degrees Celsius. Further, an equal volume of 1 mL of 3% saponin in water was added and the closed system centrifuge tube 12 was incubated for 5 minutes and then centrifuged for 10 minutes at 5,000×g at 20 degrees Celsius. The pellet was washed in 1 mL of water via the one or more ports 18 of the closed system centrifuge tube 12 and was centrifuged for 10 minutes at 5,000×g at 20 degrees Celsius. The washing process was repeated 2 times and then the pellet was resuspended in 11 µL water for boil-in PCR and plated at 100 µL for CFU assay for respective trials.

The results demonstrated in the performance summary 54 are a result of measurements from the plating of the CFU assay. The percent recovery 61 for even a low input CFU of bacteria at a sepsis level was at 18% in a whole blood sample. Multiple input numbers of CFU 58 are demonstrated to correspond with whole blood samples, blood plasma samples, and swab transport samples and the output CFU 59 and resulting percent recovery 61 is listed to correspond to the input CFU amounts. This enabled the percent recovery to be tracked, as the bacteria tested was freeze dried bacteria with known concentrations of organisms. Additionally, fresh cultures with a known CFU amount may also be used, and enable the percent recovery to be tracked based on the initial known CFU amounts of the fresh cultures. This enabled detection of the number of control bacteria in the testing trials served as an internal control of the centrifugation process. As is demonstrated, bacteria was recovered in every sample including the samples corresponding to lower input CFU. This demonstrates that the percent recovery using the closed system centrifuge tube 12 is suitable for processing of blood samples.

Figure 25:
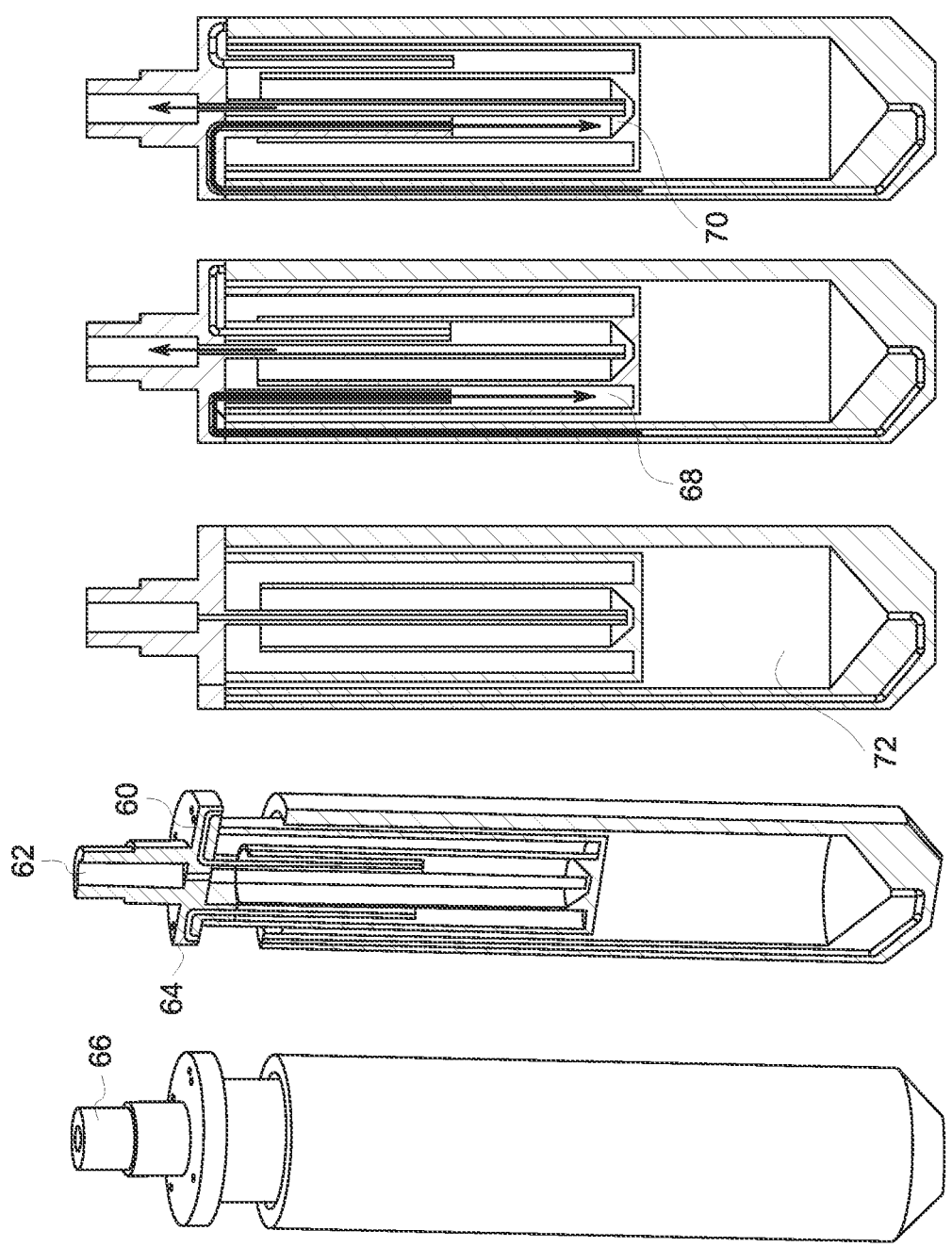
FIG. 25 depicts a further embodiment of the closed system centrifuge tube, in accordance with an embodiment of the present disclosure.

Additionally, FIG. 25 depicts a further embodiment of the closed system centrifuge tube 12, in accordance with embodiments of the present disclosure. In this embodiment, the closed system centrifuge tube 12 may include a hanging insert 60 that may be connected to multiple internal conduits 64 that may function to enable waste removal and sample insertion and/or removal within the closed system.

For example, the closed system centrifuge tube 12 may include an actuating knob 66 disposed at the top of the tube. The actuating knob 66 may be able to rotate, and the rotating motion may enable the knob to function as an actuator to establish and/or break fluidic connections between the hanging insert 60 and the inner centrifuge tube 14. During the centrifugation process, the actuating knob 66 may be rotated to seal the tube to prevent liquid leakage during centrifugation. The tube may also include a suction port 62 disposed at the top of the inner centrifuge tube 14. The suction port 62 may enable removal of air from the hanging insert 60, which may displace the sample from a sample tube connected to the hanging insert 60 to a storage chamber disposed in the inner centrifuge tube 14. The inner centrifuge tube 14 may include a waste removal chamber 68 disposed outside an inner pellet processing chamber 70. The outer waste removal chamber 68 and the inner pellet processing chamber 70 may be isolated from a bottom chamber 72 that contains the sample during centrifugation. The waste liquid resulting from the centrifugation process may be moved from the outer waste removal chamber 68 and the pellet may be removed from the inner pellet processing chamber 70 when the centrifugation process is completed.

Figure 26:
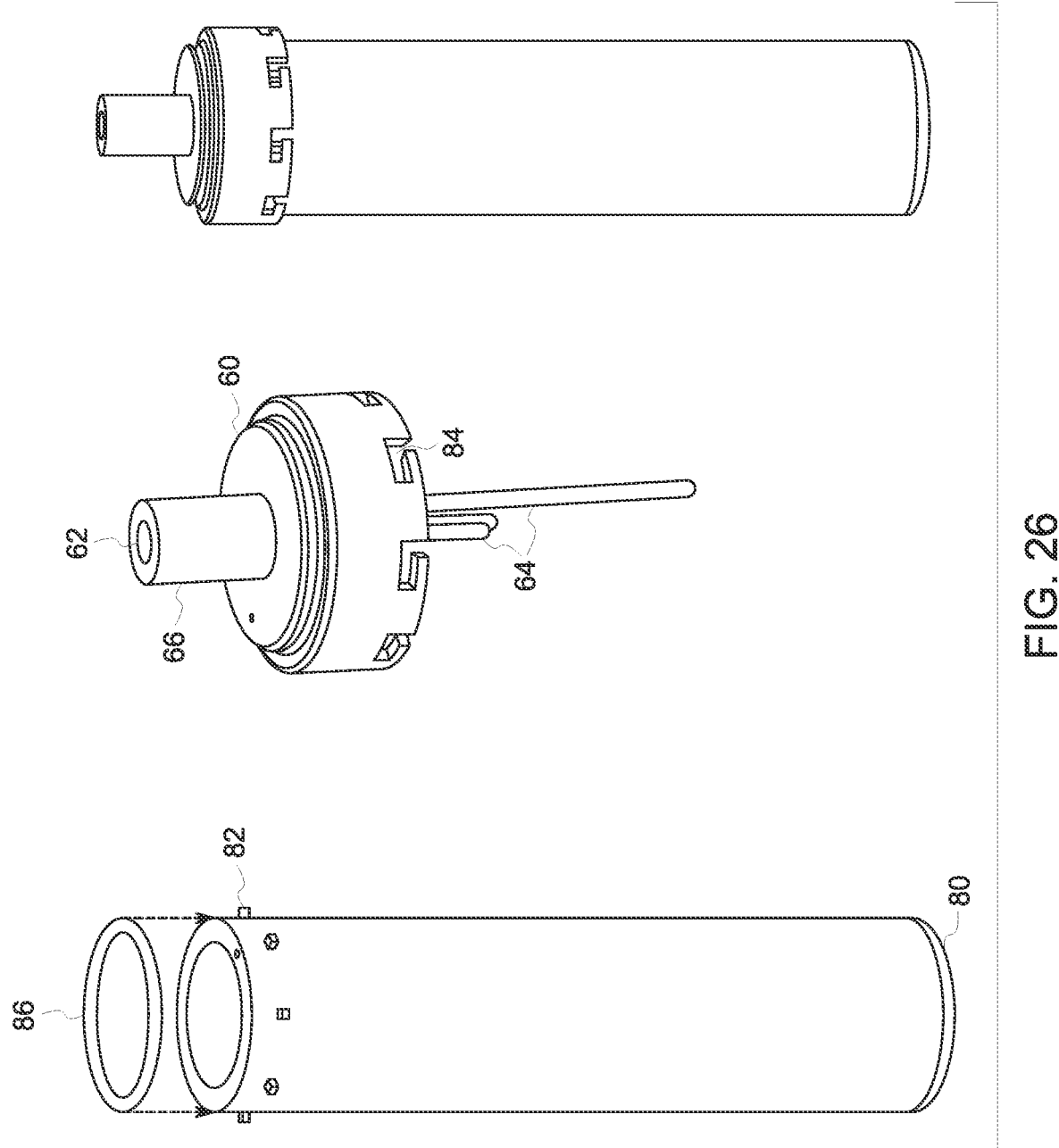
FIG. 26 depicts a diagram of an attachment mechanism of the hanging insert to the centrifuge tube bottom, in accordance with embodiments of the present disclosure.

Further, FIG. 26 depicts a diagram of an attachment mechanism of the hanging insert 60 of FIG. 24 to the centrifuge tube bottom 80, in accordance with embodiments of the present disclosure. The hanging insert 60 may include a locking mechanism that enables attachment and removal of the hanging insert 60 from the centrifuge tube bottom 80. The actuating knob 66 may function as described above, and establish and break fluidic connections between the hanging insert 60 and the centrifuge tube bottom 80. The hanging insert 60 may include multiple locking notches 84 (i.e., indents) disposed along the circumference of the bottom of the hanging insert 60. The locking notches 84 may be angled and may be designed to interlock with multiple pegs 82 disposed along the top circumference of the centrifuge tube bottom 80. The bottom centrifuge tube 18 may also include a compression silicon gasket 86. This may enable the attachment of the hanging insert 60 to the bottom centrifuge tube 80 to compress the gasket and create a seal between the hanging insert 60 and the bottom centrifuge tube 80 to enable the closed system centrifuge tube 12. The notch-peg locking mechanism 82, 84 may enable the compression of the gasket and sealing of the tube to remain in place during the centrifugation process.

Figure 27:
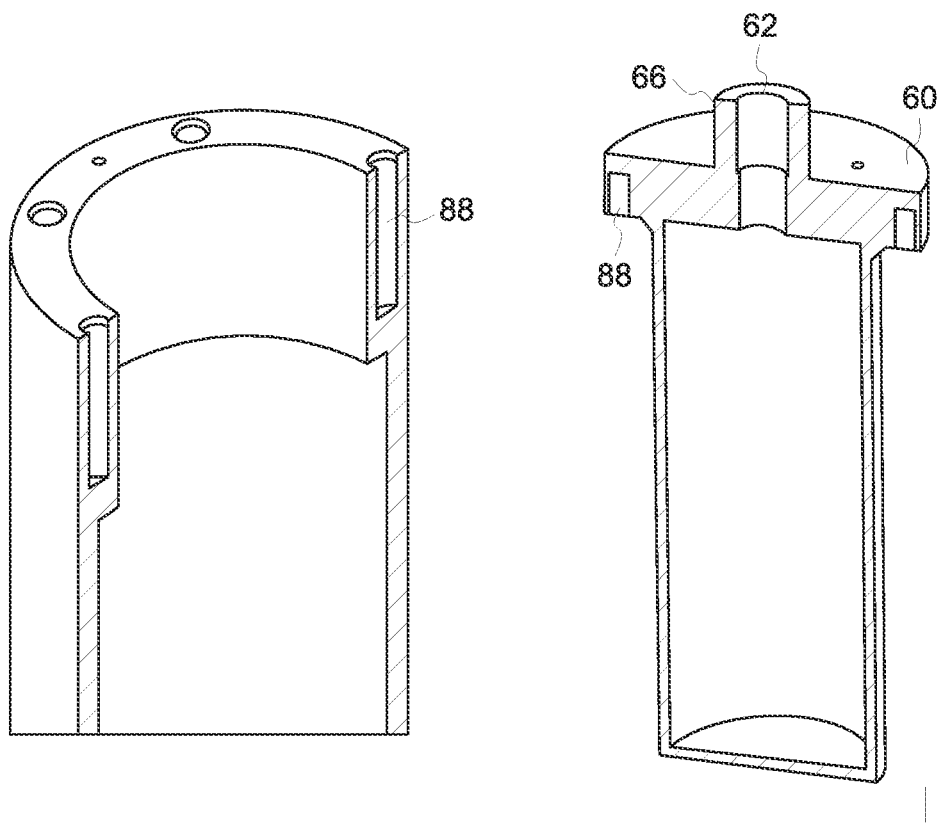
FIG. 27 depicts a further attachment mechanism of the hanging insert to the centrifuge tube bottom, in accordance with embodiments of the present disclosure.

Additionally, FIG. 27 depicts a further attachment mechanism of the hanging insert 60 to the centrifuge tube bottom 80, in accordance with embodiments of the present disclosure. In this embodiment, the hanging insert 60 may be connected to the bottom centrifuge tube 80 through magnets 88 internally embedded within the hanging insert 60 and/or the bottom centrifuge tube 80. For example, the hanging insert 60 and/or the bottom centrifuge tube 80 may include recessed columns in the side wall of the hanging insert 60 that enable insertion of a small disc and/or cylindrical magnets 88 into the recessed column. The magnets 88 embedded in the hanging insert 60 and the bottom centrifuge tube 80 may enable controlled movement of the hanging insert 60 without compromising the attachment of the hanging insert 60 to the bottom centrifuge tube.

Figure 28:
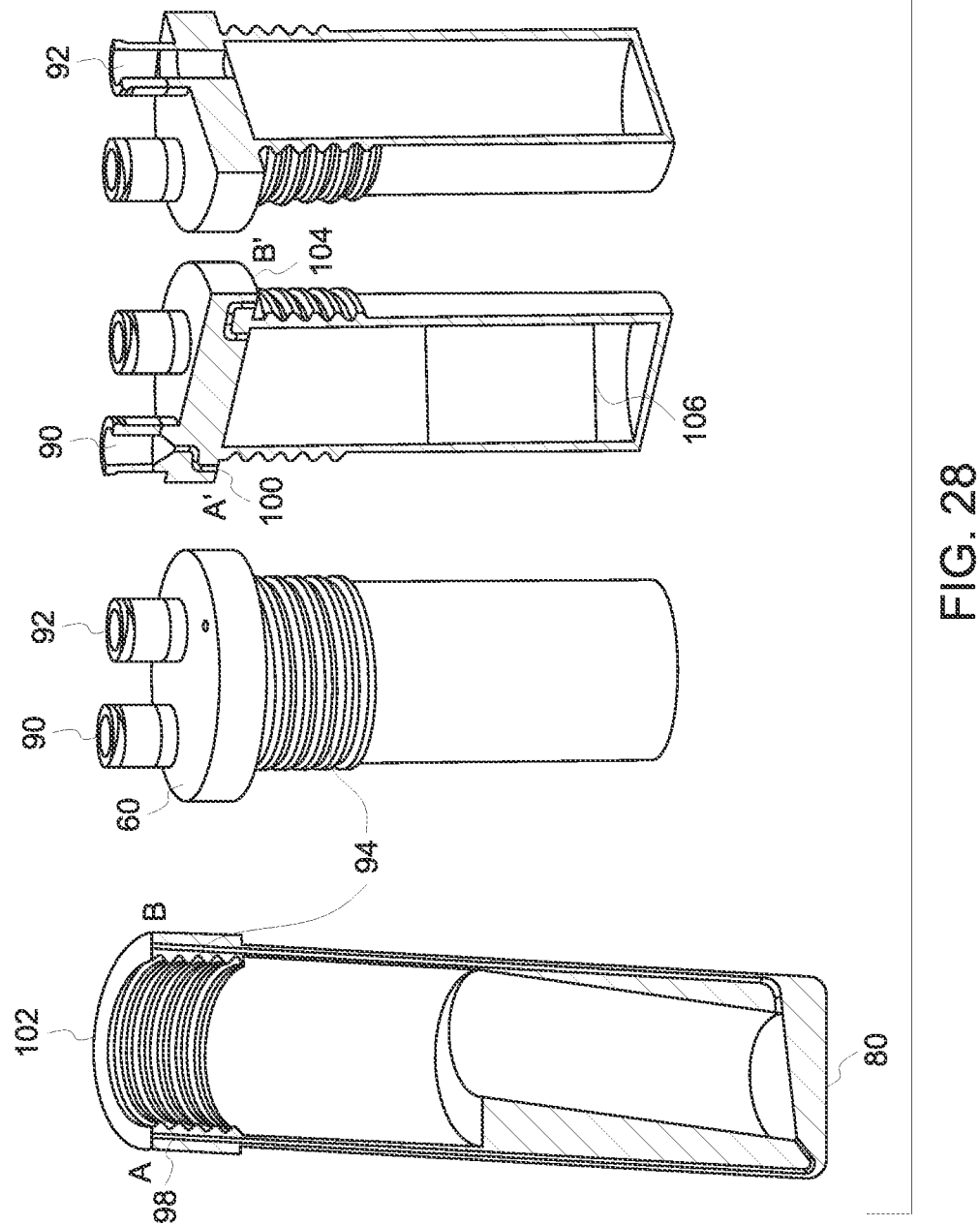
FIG. 28 depicts another attachment mechanism of the hanging insert to the centrifuge tube bottom, in accordance with embodiments of the present disclosure.
Figure 29:
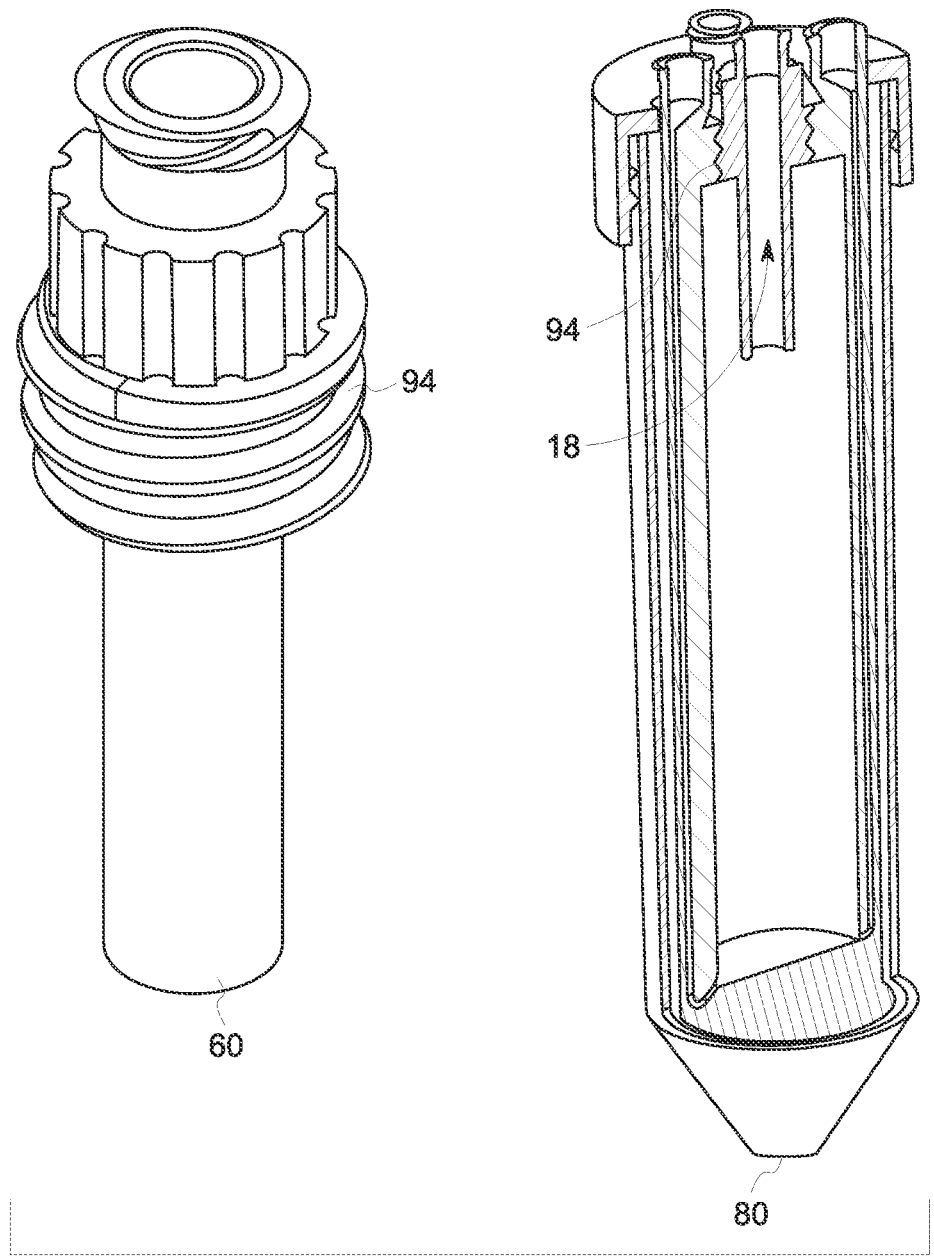
FIG. 29 depicts an additional attachment mechanism of the hanging insert to the centrifuge tube bottom, in accordance with embodiments of the present disclosure.

With the preceding in mind FIG. 28 depicts another attachment mechanism of the hanging insert 60 to the centrifuge tube bottom 80, in accordance with embodiments of the present disclosure. The hanging insert 60 and the bottom centrifuge tube 80 may include customized threads 94 on the outer surface for connecting the hanging insert 60 to the bottom centrifuge tube 80. The hanging insert 60 may include two ports disposed on the top of the insert for pellet access and suction. The pellet access may involve the connection of channel A which is coupled to the pellet access port 90 to channel A' 98 which is coupled to the bottom centrifuge tube 80. The pellet access port 90 enables direct access to the pellet that can enable washing and/or removal of the pellet. The suction may include the attachment of channel B' 104 of the suction port 92 to channel B 102 of the bottom centrifuge tube 80. The ability to apply suction at the suction port 92 enables the supernatant in the bottom centrifuge tube 80 to be collected in a storage reservoir 106 component of the bottom centrifuge tube 80. Additionally, FIG. 29 depicts an additional attachment mechanism of the hanging insert 60 to the centrifuge tube bottom 80, in accordance with embodiments of the present disclosure. In this embodiment, the hanging insert 60 and the bottom centrifuge tube 80 may be attached via a threaded connection as discussed above. The insert may function with a single port for injection and removal of the volume of the inner centrifuge tube 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A functionally closed system centrifuge tube that comprises:
   an inner centrifuge tube comprising:
      a main loading port;
      a pellet accumulation zone at a terminus of an acute-angled elbow joint;
      one or more pellet removal ports disposed on a same surface as the main loading port and located distal to the acute-angled elbow joint; and
      a microchannel embedded in side walls that connects the pellet accumulation zone through the acute-angled elbow joint to the one or more pellet removal ports.

2. The functionally closed system centrifuge tube of claim 1, wherein an outer casing is fitted around the inner centrifuge tube to form a closed system.

3. The functionally closed system centrifuge tube of claim 2, wherein the outer casing comprises an attachment cap that can be removed and reattached to the outer casing during assembly, and locked to remain closed during use.

4. The functionally closed system centrifuge tube of claim 1, wherein the one or more pellet removal ports comprise an external feature that enables attachment of a syringe or other fluid transfer device.

5. The functionally closed system centrifuge tube of claim 4, wherein the one or more pellet removal ports enable pellet removal via the syringe attached to the external feature of the one or more pellet removal ports.

6. The functionally closed system centrifuge tube of claim 5, wherein the one or more pellet removal ports enables attachment of the syringe or other transfer device to introduce a buffer liquid to a pellet for dilution, washing, and subsequent centrifugation steps.

7. The functionally closed system centrifuge tube of claim 6, wherein the one or more pellet removal ports are positioned to enable fluid injection to break the pellet into one or more fragments and wash the one or more fragments or to enable vacuum assisted fluid removal and collection of the pellet.

8. The functionally closed system centrifuge tube of claim 1, wherein one or more waste removal ports are located on the same surface as the main loading port, wherein the one or more waste removal ports are connected to an additional microchannel and is connected to a waste accumulation zone located on an additional terminus distal to the main loading port.

9. The functionally closed system centrifuge tube of claim 8, wherein the one or more waste removal ports are separated from the pellet accumulation zone by a height of less than a total height of an outer casing to enable removal of supernatant and waste without disruption of pellet and loss of centrifuged sample components in waste liquid.

10. The functionally closed system centrifuge tube of claim 1, wherein the main loading port comprises an external structure for attachment of a tube or vessel containing a sample, and injection into a centrifugation chamber of the inner centrifuge tube.

11. The functionally closed system centrifuge tube of claim 1, wherein the acute-angled elbow joint comprises an angle size corresponding to or determined based on an angle of a fixed angle centrifuge rotor used for centrifugation.

12. The functionally closed system centrifuge tube of claim 1, comprising a hanging insert configured to be inserted into the inner centrifuge tube, wherein the hanging insert includes a waste storage compartment to enable multi-step centrifugation without opening the functionally closed system centrifuge tube to remove waste.

13. The functionally closed system centrifuge tube of claim 1, wherein the one or more pellet removal ports are disposed adjacent to the pellet accumulation zone of the inner centrifuge tube, wherein the one or more pellet removal ports contain a hole sized to fit a needle, tubing, or capillary.

14. The functionally closed system centrifuge tube of claim 1, wherein the inner centrifuge tube comprises a pellet funneling zone that includes a cylindrical chamber disposed coaxial with the functionally closed system centrifuge tube, wherein the pellet funneling zone facilitates migration of particles to the pellet accumulation zone during centrifugation, and wherein the pellet accumulation zone is substantially orthogonal to the pellet funneling zone.

15. The functionally closed system centrifuge tube of claim 1, wherein the inner centrifuge tube comprises a waste collection outer chamber and a pellet processing inner chamber.

* * * * *